US011326650B2

(12) United States Patent
Mori et al.

(10) Patent No.: US 11,326,650 B2
(45) Date of Patent: May 10, 2022

(54) POWER TRANSMITTING DEVICE

(71) Applicant: HONDA MOTOR CO., LTD., Tokyo (JP)

(72) Inventors: Hidemichi Mori, Wako (JP); Hiroshi Yokota, Wako (JP); Toshiaki Deguchi, Wako (JP); Yusuke Osaki, Wako (JP); Satoru Nojima, Wako (JP); Soichiro Murakami, Wako (JP); Daisuke Sugio, Wako (JP); Takuya Hatta, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 368 days.

(21) Appl. No.: 16/498,815

(22) PCT Filed: Mar. 29, 2017

(86) PCT No.: PCT/JP2017/012842
§ 371 (c)(1),
(2) Date: Sep. 27, 2019

(87) PCT Pub. No.: WO2018/179123
PCT Pub. Date: Oct. 4, 2018

(65) Prior Publication Data
US 2020/0032853 A1 Jan. 30, 2020

(51) Int. Cl.
F16D 3/66 (2006.01)
F16D 3/68 (2006.01)
(Continued)

(52) U.S. Cl.
CPC .............. F16D 3/66 (2013.01); F16D 3/68 (2013.01); F16F 15/124 (2013.01); F16F 15/26 (2013.01)

(58) Field of Classification Search
CPC ...... F16D 3/14; F16D 3/66; F16D 3/68; F16F 15/12353; F16F 15/1236; F16F 15/1238;
(Continued)

(56) References Cited

U.S. PATENT DOCUMENTS 1,457,711 A * 6/1923 Mikkelson ................ F16D 3/66
464/61.1
5,140,720 A * 8/1992 Sisler ........................ F16D 3/66
16/35 D
(Continued)

FOREIGN PATENT DOCUMENTS

FR 1104652 A * 11/1955 ............... F16D 3/68
JP 2002-147484 A 5/2002
(Continued)

OTHER PUBLICATIONS

Office Action, with a dispatch date of Nov. 18, 2020, issued over the corresponding Indian Patent Application No. 201917038948.

Primary Examiner — Josh Skroupa
(74) Attorney, Agent, or Firm — Carrier Blackman & Associates, P.C.; William D. Blackman; Joseph P. Carrier

(57) ABSTRACT

A power transmitting device includes a first rotor and a second rotor rotatably disposed coaxially with a rotational central axis and in facing relation to each other, a single arc spring that is elastically deformable to a large extent and has a small modulus of elasticity, the arc spring being interposed between the first rotor and the second rotor for urging the first rotor and the second rotor to opposite sides in a ration direction, a first pressing protrusion projecting from the first rotor and a second pressing protrusion projecting from the second rotor, the first pressing protrusion and the second pressing protrusion being disposed in relative positions on superposed rotation trajectories, and a rubber member that is elastically deformable to a small extent and has a large modulus of elasticity, the rubber member being interposed between the first pressing protrusion and the second pressing protrusion with gaps therebetween.

11 Claims, 20 Drawing Sheets

(51) Int. Cl.
*F16F 15/124* (2006.01)
*F16F 15/26* (2006.01)

(58) Field of Classification Search
CPC .... F16F 15/124; F16F 15/1245; F16F 15/126;
F16F 15/127; F16F 15/26; F16F 15/264
USPC .................................. 464/67.1, 68.9, 68.91
See application file for complete search history.

(56) References Cited

U.S. PATENT DOCUMENTS

| | | | |
|---|---|---|---|
| 5,146,804 A * | 9/1992 | Carmillet | ................. F16D 3/66 464/68.1 |
| 7,334,553 B2 | 2/2008 | Satoh et al. | |
| 2016/0123453 A1* | 5/2016 | Starodoubov | ............. F16D 3/66 474/94 |

FOREIGN PATENT DOCUMENTS

| | | |
|---|---|---|
| JP | 2005-106086 A | 4/2005 |
| JP | 2009-008186 A | 1/2009 |
| JP | 2009-209969 A | 9/2009 |
| WO | 01/73309 A1 | 10/2001 |
| WO | 2012/176573 A1 | 12/2012 |

\* cited by examiner

POWER TRANSMITTING DEVICE

TECHNICAL FIELD

The present invention relates to a power transmitting device for transmitting power.

BACKGROUND ART

Some power transmitting devices have a damper mechanism using an elastic member.

Heretofore, there has been an example in which different kinds of elastic members are used in combination as such an elastic member (see, for example, Patent Document 1).

PRIOR ART DOCUMENT

Patent Document 1: JP 2002-147484 A

Patent Document 1 discloses a damper mechanism including a plurality of damper pairs each having a combination of a coil spring and a rubber member that are elastically deformable to different extents and have different moduli of elasticity and that act linearly, the damper pairs being arrayed in series along circumferential directions.

SUMMARY OF THE INVENTION

Underlying Problems to be Solved by the Invention

The coil springs act under a low torque load and the rubber members act under a high torque load to absorb shocks depending on the high or low torque load. In case the coil springs that act linearly are arranged circumferentially to bear torque loads, the coil springs need to be kept as linearly as possible in order to make their elasticity work properly. Therefore, the coil springs are naturally short, and hence fail to be elastically deformed to a large extent and make it difficult to maintain a relatively large stroke.

A plurality of short coil springs that are arrayed in series along circumferential directions make it possible to maintain a large stroke. However, the damper mechanism is made up of an increased number of parts, complex in structure, large in size, and high in cost.

The present invention has been made in view of the above problems. It is an object of the present invention to provide a power transmitting device including a simple-structure, small-size shock absorbing mechanism that is capable of absorbing shocks in a large stroke under a low torque load and effectively absorbing shocks in a small stroke under a high torque load.

Means to Solve the Problem

In order to achieve the above object, there is provided in accordance with the present invention a power transmitting device including:

a first rotor and a second rotor that are rotatably disposed coaxially with a rotational central axis and in facing relation to each other;

a single arc spring that is elastically deformable to a large extent and has a small modulus of elasticity, the arc spring being interposed between the first rotor and the second rotor for urging the first rotor and the second rotor to opposite sides in a rotation direction;

a first pressing protrusion projecting from the first rotor and a second pressing protrusion projecting from the second rotor, the first pressing protrusion and the second pressing protrusion being disposed in relative positions on superposed rotation trajectories; and a rubber member that is elastically deformable to a small extent and has a large modulus of elasticity, the rubber member being interposed between the first pressing protrusion and the second pressing protrusion with gaps therebetween.

With this arrangement, the single arc spring is interposed between the first rotor and the second rotor that are disposed coaxially with the rotational central axis and in facing relation to each other, for urging the first rotor and the second rotor to opposite sides in a rotation direction, the first pressing protrusion projecting from the first rotor and the second pressing protrusion projecting from the second rotor are disposed in relative positions on superposed rotation trajectories, and the rubber member is interposed between the first pressing protrusion and the second pressing protrusion with gaps therebetween. When a torque load is applied to the first rotor and the second rotor, causing the first rotor and the second rotor to rotate relatively to each other, the arc spring that is elastically deformable to a large extent and has a small modulus of elasticity is initially elastically deformed under compression. As the torque load increases, the first pressing protrusion and the second pressing protrusion of the second rotor reduce the gap therebetween, pinching the rubber member which has been interposed therebetween with gaps, whereupon the rubber member that is elastically deformable to a small extent and have a large modulus of elasticity is elastically deformed under compression.

While the torque load is low, the arc spring that is elastically deformable to a large extent and has a small modulus of elasticity effectively absorbs shocks in a large stroke.

When the torque load increases, the rubber member that is elastically deformable to a small extent and have a large modulus of elasticity is elastically deformed under compression. The rubber member effectively absorbs a larger shock for smooth power transmission.

In other words, the arc spring operates under a low torque load and the rubber member operates under a high torque load to effectively absorb shocks depending on the high or low torque load for smooth power transmission at all times.

The arc spring includes an arcuate coil spring. Even though the arc spring interposed between the first rotor and the second rotor is single, it can be set to a large elastically operable angle (stroke) in which it is elastically deformable to make its elasticity work properly. Therefore, it is possible to provide a simple-structure, small-size shock absorbing mechanism made up of a small number of parts.

In the above arrangement, the first rotor and the second rotor may have a first housing groove and a second housing groove of an identical arcuate shape, defined respectively in a first facing surface and a second facing surface thereof that are disposed closely to each other and in facing relation to each other; and the arc spring may have halves housed respectively in the first housing groove and the second housing groove and is interposed between the first rotor and the second rotor.

With this arrangement, since the arc spring is interposed between the first rotor and the second rotor with the respective halves housed in the first housing groove and the second housing groove, respectively, a compressing structure of the arc spring for urging the first rotor and the second rotor to opposite sides in a rotation direction and a holding structure of the arc spring can be made up of a minimum number of simple parts.

In the above arrangement, the rubber member may be fitted over either one of the first pressing protrusion and the second pressing protrusion.

With this arrangement, as the rubber member is fitted over either one of the first pressing protrusion and the second pressing protrusion, the rubber member is simply mounted on either one of the first pressing protrusion and the second pressing protrusion without using special mounting members, and fixedly supported between the first pressing protrusion and the second pressing protrusion.

In the above arrangement, the first rotor may have:
an arcuate groove defined in the first facing surface on substantially the same circumference as the first housing groove;
a pair of the first pressing protrusions disposed in the arcuate groove respectively near circumferentially opposite ends of the arcuate groove; and
the rubber member fitted over each of the first pressing protrusions; and
the second rotor may have:
the second housing groove being open in the second facing surface; and
the second pressing protrusion projecting from a nearly circumferentially central portion of an arcuate area of the second facing surface that corresponds to the arcuate groove.

With this arrangement, on the first rotor, the first housing groove is open in the first facing surface, and the arcuate groove defined therein substantially concentrically with the first housing groove is open in the first facing surface. The paired first pressing protrusions are disposed in the arcuate groove near the both circumferential ends thereof, and the rubber member is fitted over each of the paired first pressing protrusions. On the second rotor, the second housing groove is open in the second facing surface, and the second pressing protrusion projects from the nearly circumferentially central portion of the arcuate area of the second facing surface that corresponds to the arcuate groove. Therefore, the second pressing protrusion of the second rotor is inserted between the rubber member fitted over each of the paired first pressing protrusions of the first rotor. Under a high torque load, the second pressing protrusion and either one of the paired first pressing protrusion pinch the rubber member. The rubber member that is elastically deformable to a small extent and has a large modulus of elasticity is elastically deformed under compression and effectively absorb a larger shock for smooth power transmission.

In the above arrangement, the rubber member fitted over each of the first pressing protrusions may be housed in the arcuate groove.

With this arrangement, since the rubber member that is fitted over the first pressing protrusion is housed in the arcuate groove, the rubber member does not project outwardly from the first facing surface. Upon relative rotation of the first rotor and the second rotor, the circumferential end edges of the second housing groove in the second rotor do not physically interfere with the rubber member, and hence do not damage the rubber member and impair the durability thereof.

In the above arrangement, the first rotor may be of a disk shape and has a pair of the arcuate grooves defined therein opposite portions of the first housing groove across the rotational central axis;
the first rotor may have a machining margin for unbalance adjustment behind the first housing groove that houses one-half of the arc spring therein; and the second rotor may be of a disk shape and have a machining margin for unbalance adjustment opposite the second housing groove across the rotational central axis.

With this arrangement, since the first rotor of the disk shape has the pair of arcuate grooves opposite portions of the first housing groove across the rotational central axis, the first rotor tends to be unbalanced as it is heavier on the side of the first housing groove. The machining margin for unbalance adjustment behind the first housing groove is cut off to reduce the unbalance, making the first rotor balanced to thereby restrain itself from being vibrated due to the unbalance.

Since the second rotor of the disk shape tends to be unbalanced as it is heavier on the side opposite the second housing groove across the rotational central axis on account of the second housing groove, the machining margin for unbalance adjustment is disposed opposite the second housing groove and cut off to reduce the unbalance, making the second rotor balanced to thereby restrain itself from being vibrated due to the unbalance.

In the above arrangement, the first rotor may include an internal-combustion-engine-side rotor with power being transmittable between itself and a crankshaft of an internal combustion engine;
the second rotor may include a starter-generator-side rotor with power being transmittable between itself and an input/output shaft of a starter generator;
the first pressing protrusion may include an internal-combustion-engine-side pressing protrusion; and
the second pressing protrusion may include a starter-generator-side pressing protrusion.

With this arrangement, under a low torque load applied to the internal-combustion-engine-side rotor and the starter-generator-side rotor, causing them to rotate at a small rotational speed difference when the internal combustion engine is in normal operation, the arc spring that is elastically deformable to a large extent and has a small modulus of elasticity is compressively deformed and absorbs a smaller shock for smooth power transmission.

On the other hand, under a high torque load applied to the internal-combustion-engine-side rotor and the starter-generator-side rotor, causing them to rotate at a large rotational speed difference when the internal combustion engine is started, stalled, or operated for quick acceleration, the rubber member that is elastically deformable to a small extent and has a large modulus of elasticity, as well as the arc spring, is compressively deformed and absorbs a larger shock.

In the above arrangement, the starter-generator-side pressing protrusion that is disposed between a pair of the rubber members fitted respectively over a pair of the internal-combustion-engine-side pressing protrusions may be positioned closer to one of the rubber members that is spaced from the starter-generator-side pressing protrusion in the direction of rotation when no relative torque load is applied to the internal-combustion-engine-side rotor and the starter-generator-side rotor.

With this arrangement, when there is no rotational speed difference between the internal-combustion-engine-side rotor and the starter-generator-side rotor, the starter-generator-side pressing protrusion disposed between the paired rubber members is positioned closer to one of the rubber members that is spaced therefrom in the direction of rotation. Consequently, for an engine startup, the starter-generator-side pressing protrusion acts earlier on the rubber member that is spaced therefrom in the direction of rotation, resulting in a reduced operation loss for starting the engine early.

When the motorcycle travels normally, until the starter-generator-side pressing protrusion acts on the other rubber member that is positioned on the opposite side of the starter-generator-side pressing protrusion to the direction of rotation, the arc spring is compressively varied to a large extent and absorbs a smaller shock for smooth power transmission. Noise such as gear lash noise can thus be restrained.

In the above arrangement, the starter-generator-side rotor may have a tubular shaft projecting from a central portion thereof through the internal-combustion-engine-side rotor and having the rotational central axis as a central axis;

a helical gear may be slidably supported on the tubular shaft on a side thereof opposite the starter-generator-side rotor across the internal-combustion-engine-side rotor;

the internal-combustion-engine-side rotor that faces the starter-generator-side rotor may be fixed to the helical gear; and a disk spring may be interposed between a collar that is prevented from sliding by a stopper that engages an outer circumference of the tubular shaft on an opposite side of the internal-combustion-engine-side rotor across the helical gear and the helical gear.

With this arrangement, the internal-combustion-engine-side rotor is fixed to the helical gear slidably and rotatably supported on the rotor shaft of the starter-generator-side rotor. The disk spring is interposed between the collar that is prevented from sliding by the stopper that engages the outer circumference of the rotor shaft on an opposite side of the internal-combustion-engine-side rotor with respect to the helical gear and the helical gear. Therefore, the internal-combustion-engine-side rotor is normally urged by the disk spring to move toward the disk-shaped starter-generator-side rotor, and is allowed to move together with the helical gear in a thrust direction against the disk spring for smooth power transmission while being prevented from being unnecessarily spaced away from the starter-generator-side rotor.

In the above arrangement, the helical gear may have such a thread helix that when the helical gear operates as a drive gear, the helical gear produces a thrust force for pressing the internal-combustion-engine-side rotor against the starter-generator-side rotor.

With this arrangement, inasmuch as the helical gear has such a thread helix that when the helical gear operates as a drive gear, the helical gear produces a thrust force for pressing the internal-combustion-engine-side rotor against the starter-generator-side rotor. Therefore, for an engine startup, the helical gear operates as a drive gear, pressing the internal-combustion-engine-side rotor against the starter-generator-side rotor. The helical gear is prevented from moving in a thrust direction for transmitting power without an operation loss, so that the internal combustion engine can quickly be started without a feeling of startup slowness. For an engine acceleration, on the other hand, the helical gear operates as a driven gear, moving the internal-combustion-engine-side rotor in a thrust direction away from the starter-generator-side rotor against the disk spring to absorb shocks.

Advantageous Effects of the Invention

According to the present invention, the single arc spring is interposed between the first rotor and the second rotor that are disposed coaxially with the rotational central axis and in facing relation to each other, for urging the first rotor and the second rotor to rotate in directions of rotation that are opposite each other, the first pressing protrusion projecting from the first rotor and the second pressing protrusion projecting from the second rotor are disposed in relative positions on superposed rotation trajectories, and the rubber member is interposed between the first pressing protrusion and the second pressing protrusion with gaps therebetween. When a torque load is applied to the first rotor and the second rotor, causing the first rotor and the second rotor to rotate relatively to each other, the arc spring that is elastically deformable to a large extent and has a small modulus of elasticity is initially elastically deformed under compression. As the torque load increases, the first pressing protrusion and the second pressing protrusion reduce the interval therebetween, pinching the rubber member interposed therebetween with gaps, whereupon the rubber member that is elastically deformable to a small extent and have a large modulus of elasticity is elastically deformed under compression.

The arc spring operates under a low torque load and the rubber member operates under a high torque load to effectively absorb shocks depending on the high or low torque load for smooth power transmission at all times.

The arc spring includes an arcuate coil spring. Even though the single arc spring is interposed between the first rotor and the second rotor, it can be set to a large elastically operable angle (stroke) in which it is elastically deformable to make its elasticity work properly. Therefore, it is possible to provide a simple-structure, small-size shock absorbing mechanism made up of a small number of parts.

MODE FOR CARRYING OUT THE INVENTION

An embodiment of the present invention will hereinafter be described below with reference to FIGS. 1 through 27.

Figure 1:
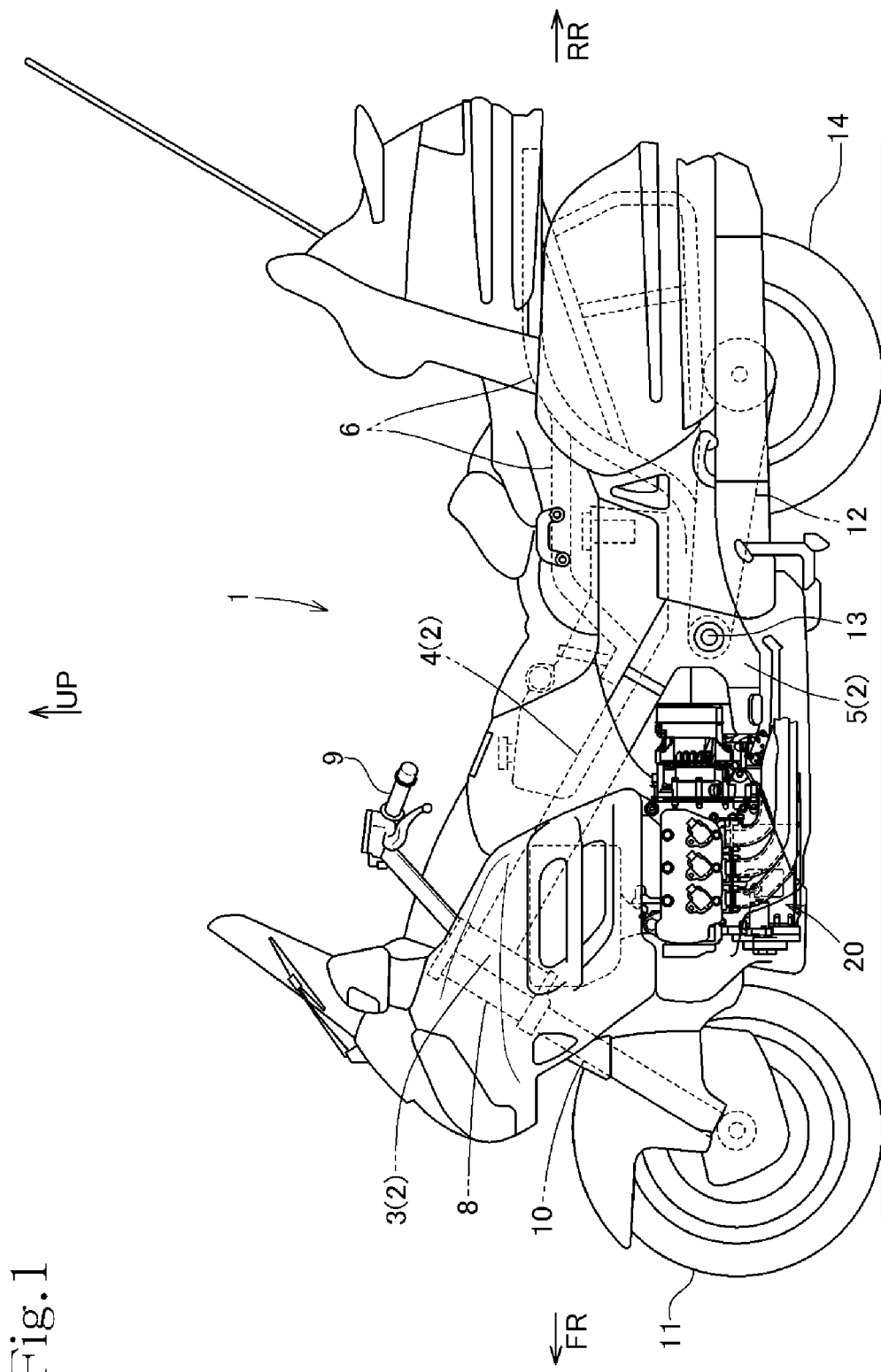
FIG. 1 is an overall side elevational view of a motorcycle incorporating an internal combustion engine that includes a power transmitting device according to an embodiment of the present invention.

FIG. 1 is a side elevational view of a motorcycle 1 as a saddle-type vehicle incorporating an internal combustion engine that includes a power transmitting device according to the embodiment of the present invention.

In the present description, forward, rearward, leftward, rightward, and similar directional expressions are defined in accordance with the normal orientations of the motorcycle 1 according to the present embodiment that include a forward direction along which the motorcycle 1 moves straight ahead. In the drawings, the reference characters FR represent a forward direction, RR a rearward direction, LH a leftward direction, RH a rightward direction, and UP an upward direction.

The motorcycle 1 incorporates a horizontally opposed 6-cylinder, water-cooled 4-stroke internal combustion engine 20 oriented longitudinally of the motorcycle 1.

The motorcycle 1 includes a vehicle body frame 2 having a pair of left and right main frames 4 extending rearwardly and obliquely downwardly from a head pipe 3 on a front vehicle body portion, a pivot frame 5 connected to the rear ends of the main frames 4, and a seat frame 6 having a front end connected to the pivot frame 5 and extending rearwardly and obliquely upwardly from the front end and bent substantially horizontally and rearwardly.

A steering handle 9 is mounted on an upper portion of a steering stem 8 that is rotatably supported on the head pipe 3. A pair of left and right front fork members 10 extend obliquely forwardly and downwardly from the steering stem 8. A front wheel 11 is rotatably supported on the lower ends of the front fork members 10.

A swing arm 12 has a front end pivotally supported on the pivot frame 5 by a pivot shaft 13. Rear wheels 14 are rotatably supported in a cantilevered fashion on the rear end of the swing arm 12 that is vertically swingable.

The internal combustion engine 20 is suspended beneath the main frames 4. The internal combustion engine 20 has an output shaft 43 extending rearwardly through the swing arm 12 into a gearbox, not illustrated, disposed centrally between the rear wheels, i.e., left and right rear wheels 14, for transmitting power of the internal combustion engine 20 to the rear wheels 14.

Figure 2:
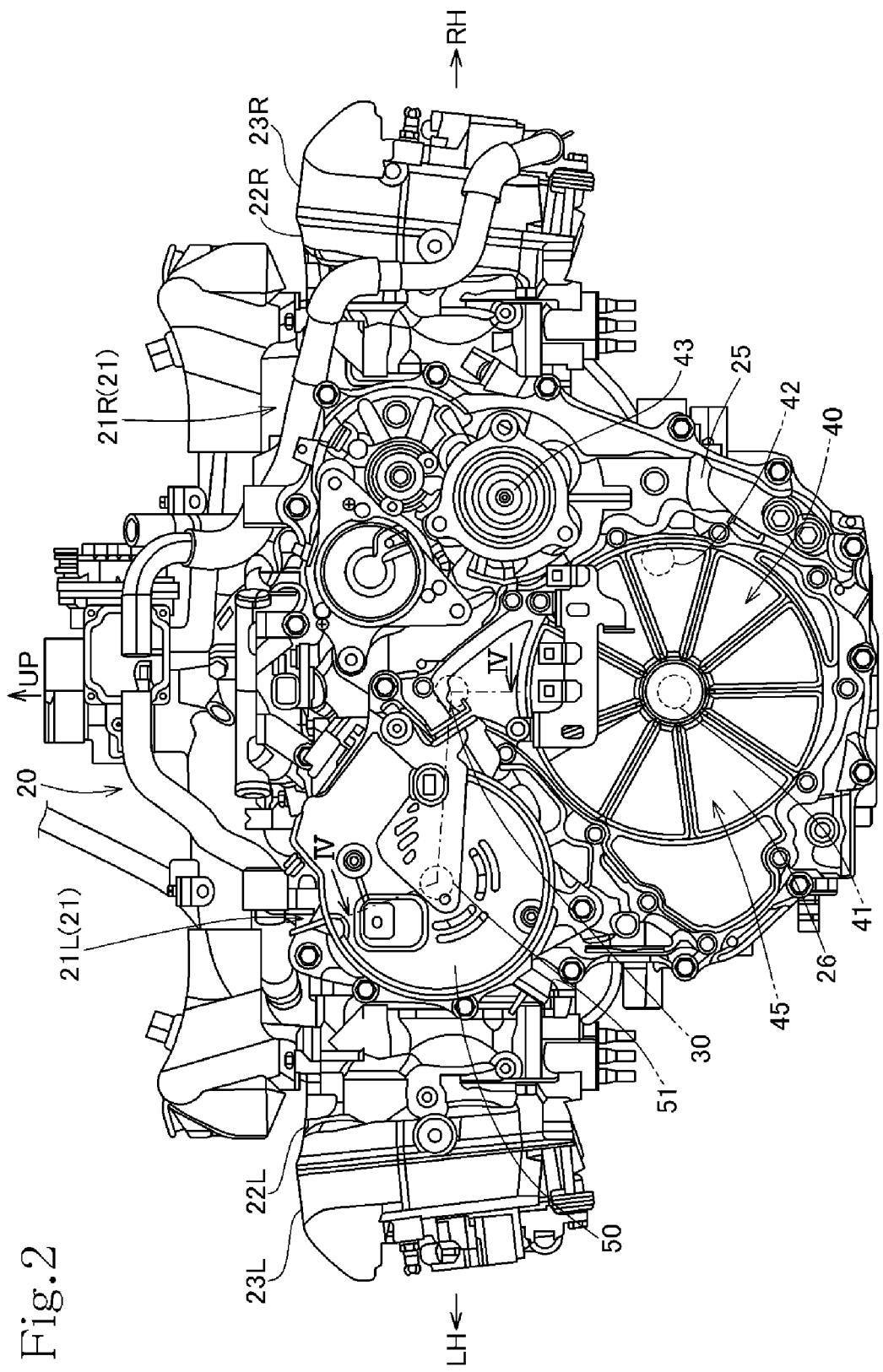
FIG. 2 is a rear elevational view of the internal combustion engine.
Figure 3:
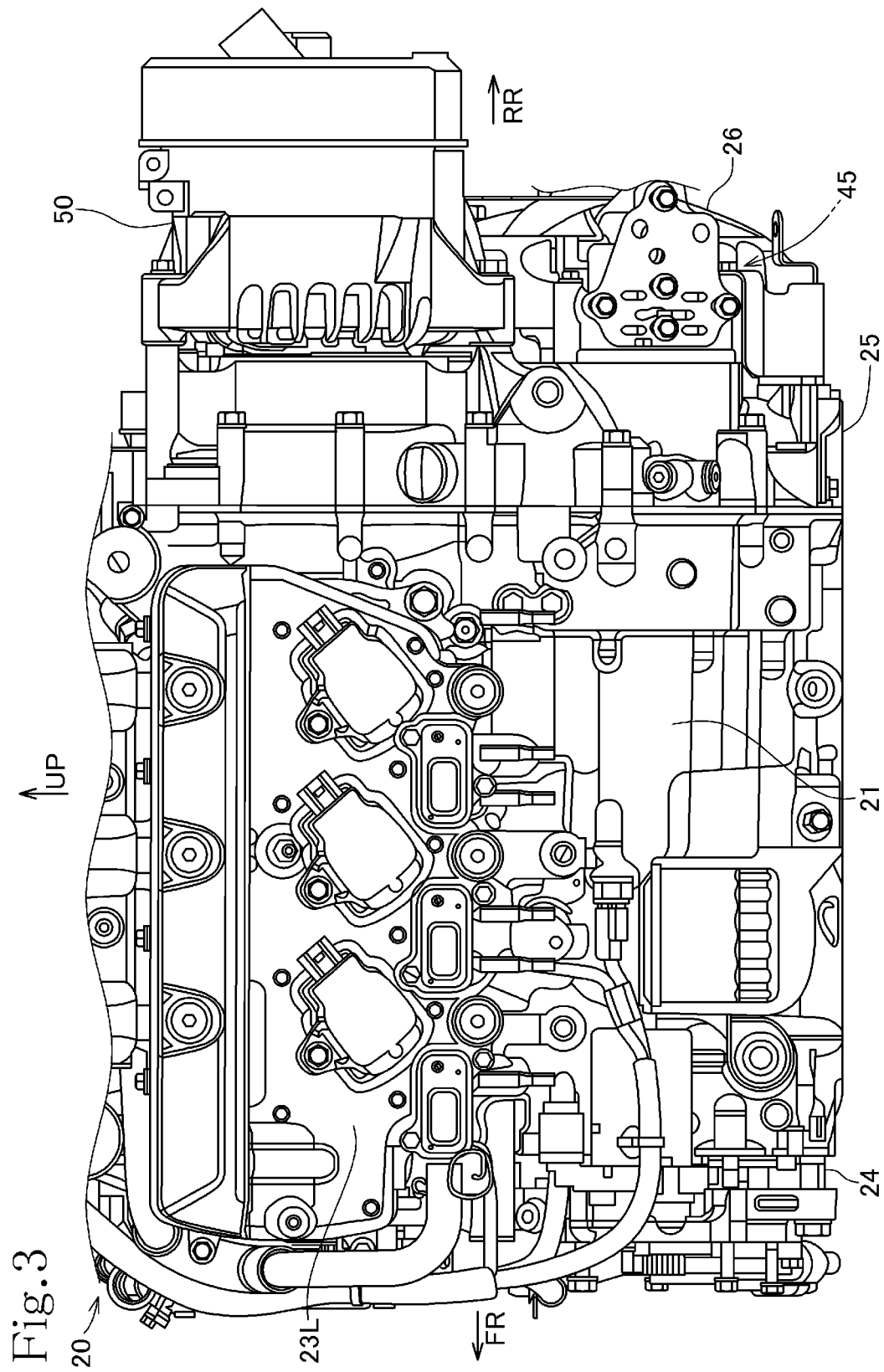
FIG. 3 is a left-hand side elevational view of the internal combustion engine.

FIG. 2 is a rear elevational view of the horizontally opposed 6-cylinder internal combustion engine 20. FIG. 3 is a left-hand side elevational view of the internal combustion engine 20.

The internal combustion engine 20 includes a crankcase 21 housing a crankshaft 30 oriented in forward and rearward directions and rotatably supported in an upper half portion thereof and also housing a multistage transmission 40 in a lower half portion thereof.

Referring to FIG. 2, the upper half portion of the crankcase 21 includes a left cylinder portion 21L and a right cylinder portion 21R that project from a central portion housing the crankshaft 30 therein substantially horizontally to left and right sides.

Each of the left cylinder portion 21L and the right cylinder portion 21R has three cylinders defined therein that are arrayed in the forward and rearward directions.

A left cylinder head 22L is stacked on and fastened to a left side of the left cylinder portion 21L, and a left cylinder head cover 23L covers a left side of the left cylinder head 22L.

Similarly, a right cylinder head 22R is stacked on and fastened to a right side of the right cylinder portion 21R, and a right cylinder head cover 23R covers a right side of the right cylinder head 22R.

Referring to FIG. 3, a front crankcase cover 24 is stacked on and fastened to a front end face of the crankcase 21. A rear crankcase cover 25 is stacked on and fastened to a rear end face of the crankcase 21.

Referring to FIG. 2, the transmission 40 that is housed in the lower half portion of the crankcase 21 includes a main shaft 41 positioned below the crankshaft 30 and a countershaft 42 positioned rightwardly of the main shaft 41.

The main shaft 41 and the countershaft 42 are oriented parallel to the crankshaft 30 in the forward and rearward directions.

The output shaft 43 is positioned obliquely upwardly of the countershaft 42.

A twin clutch 45 is mounted on a rear end of the main shaft 41 that extends rearwardly through the rear crankcase cover 25. The twin clutch 45 has a rear side covered with a clutch cover 26.

As illustrated in FIGS. 2 and 3, a starter generator 50 is mounted on a rear side of the rear crankcase cover 25 leftwardly and obliquely upwardly of the twin clutch 45.

The starter generator 50 is positioned behind the left cylinder portion 21L of the internal combustion engine 20.

Figure 4:
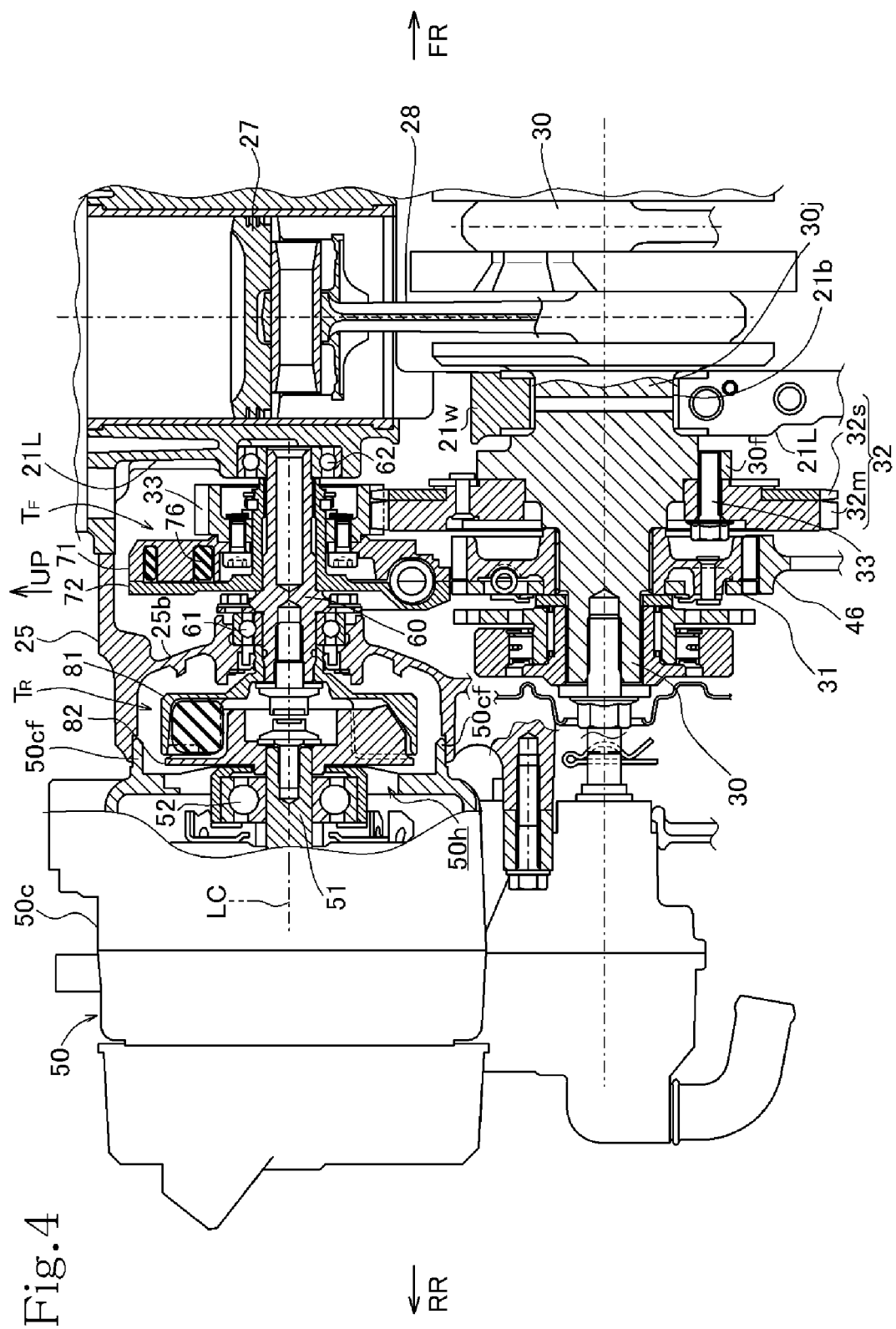
FIG. 4 is a partial cross-sectional view taken alone line IV-IV of FIG. 2.

As illustrated in FIG. 4, which is a partial cross-sectional view taken alone line IV-IV of FIG. 2, a connecting rod 28 interconnects a piston 27 reciprocably movable in a cylinder bore defined in a rear cylinder in the left cylinder portion 21L and the crankshaft 30, making up a crank mechanism.

The crankshaft 30 has a rear journal 30j rotatably supported on a bearing wall 21w of the left cylinder portion 21L by a metal bearing 21b, and includes a mounting flange 30f disposed behind and next to the journal 30j.

Figure 7:
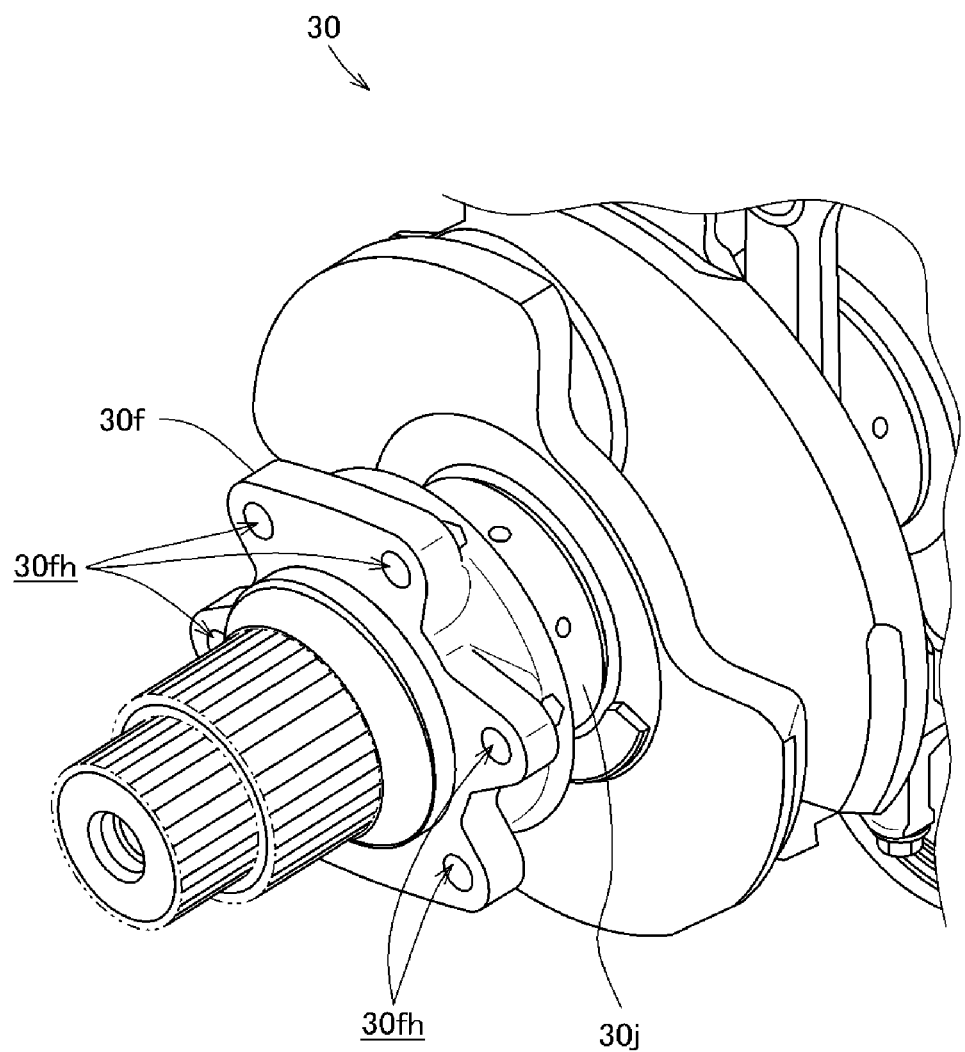
FIG. 7 is a partial perspective view of a crankshaft.

As illustrated in FIG. 7, the mounting flange 30f includes radial protrusions having six mounting holes 30fh defined therein concentrically with each other.

A large-diameter helical gear 32 is securely mounted on the mounting flange 30f by six bolts 32b.

The large-diameter helical gear 32 is a backlash eliminating gear assembly including a main gear 32m and a sub-gear 32s that are superposed one on the other and coupled together with springs interposed therebetween.

Figure 6:
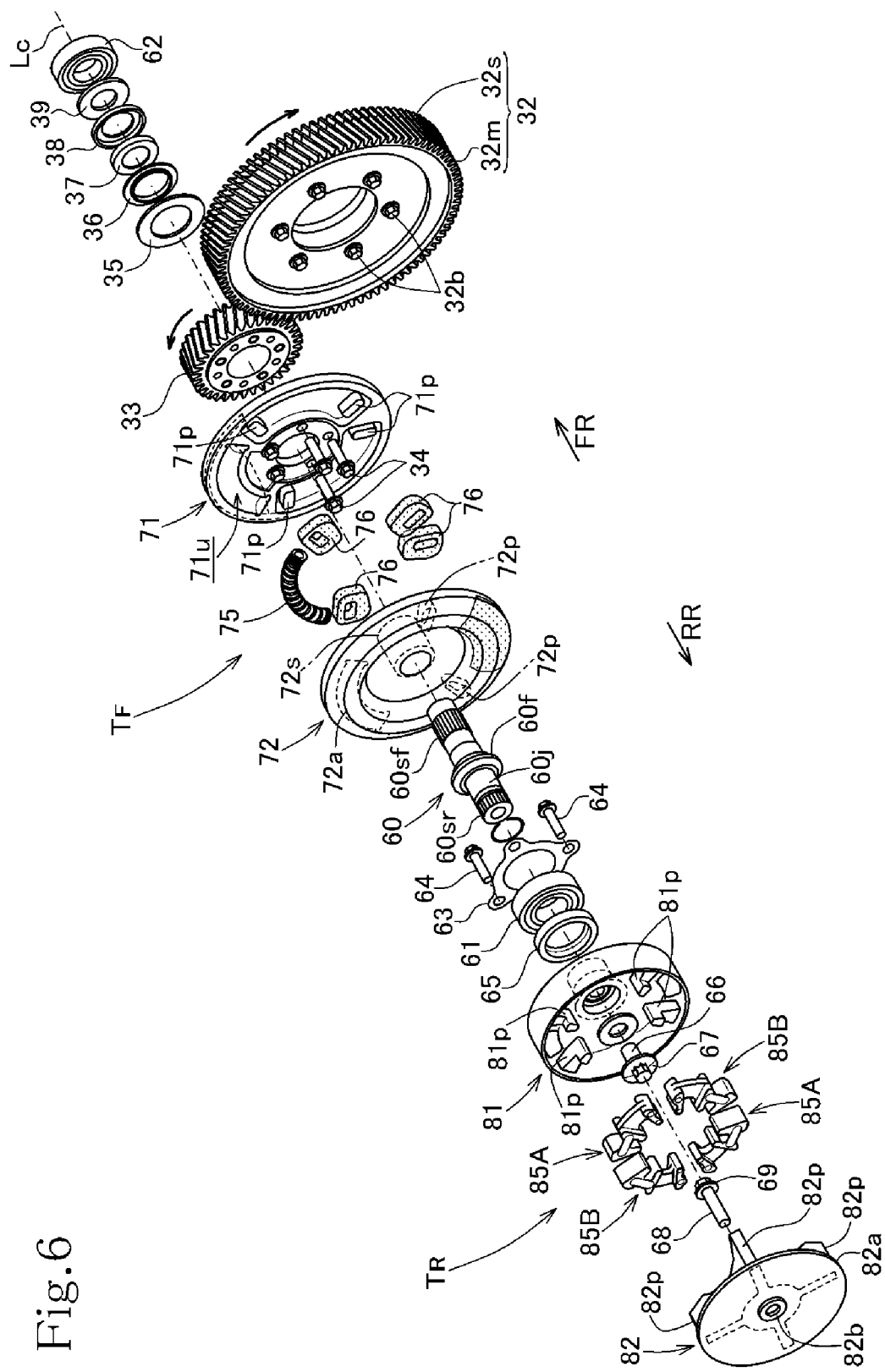
FIG. 6 is an exploded perspective view of a front-stage power transmitting device and a rear-stage power transmitting device whose parts are illustrated as spaced along a rotational central axis.

This large-diameter helical gear 32 is a helical gear having both the main gear 32m and the sub-gear 32s with a right-hand thread helix (with threads helically oriented to the right and the upper as viewed in front elevation) (see FIG. 6).

Referring to FIG. 4, a primary drive gear 31 is coupled by serrations to the crankshaft 30 adjacent to the large-diameter helical gear 32.

The primary drive gear 31, which is also a backlash eliminating gear, is held in mesh with a primary driven gear 46 fitted over the main shaft 41.

Two-stage power transmitting devices $T_F$ and $T_R$, i.e., a front-stage power transmitting device $T_F$ and a rear-stage power transmitting device $T_R$, are interposed in series between the crankshaft 30 of the internal combustion engine 20 and an input/output shaft 51 of the starter generator 50.

The front-stage power transmitting device $T_F$ and the rear-stage power transmitting devices $T_R$ are disposed in an array coaxially with the input/output shaft 51 of the starter generator 50.

The power transmitting device according to the present invention is the front-stage power transmitting device $T_F$.

Figure 5:
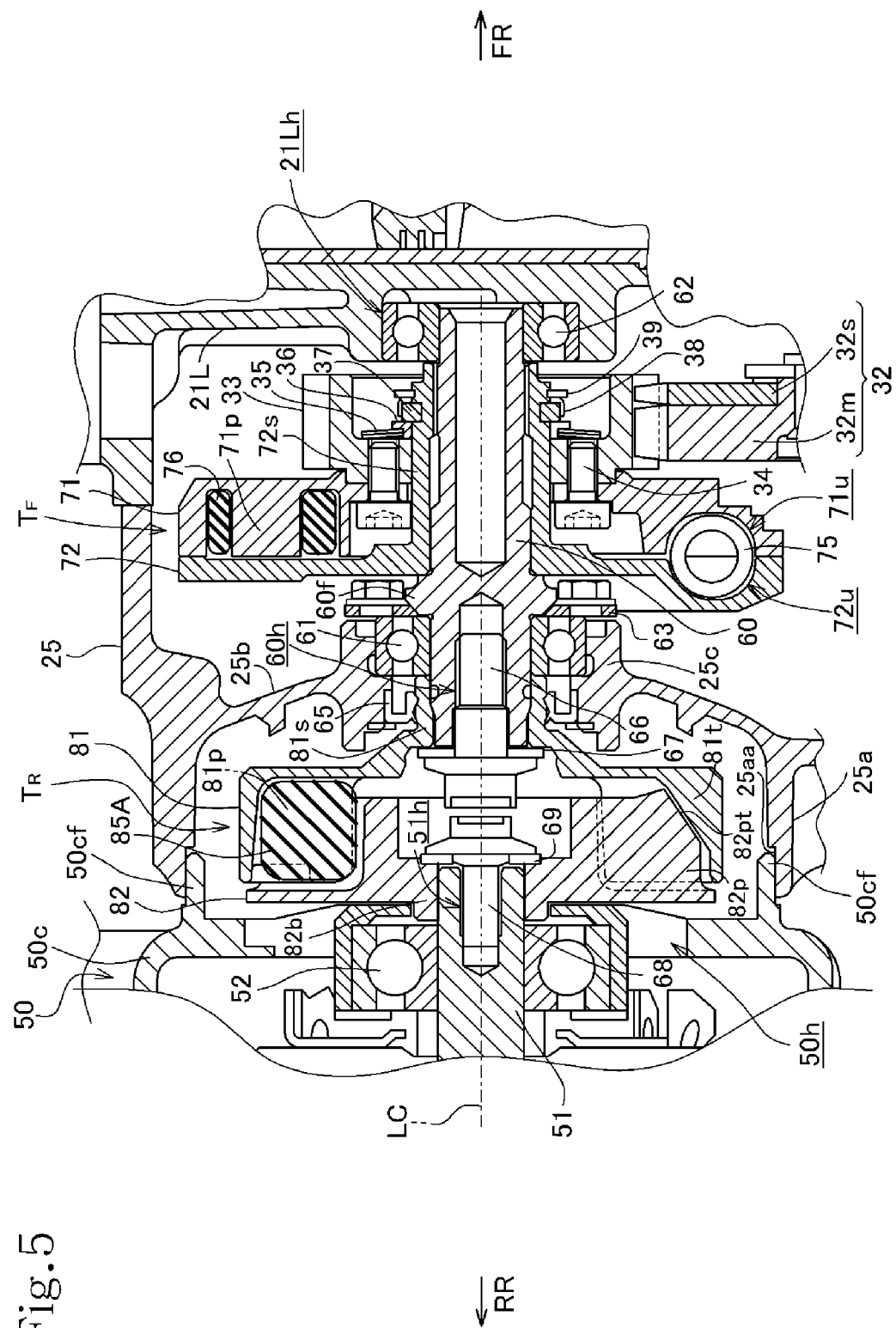
FIG. 5 is an enlarged view of a portion of FIG. 4.

Referring to FIGS. 4 and 5, the starter generator 50 includes a casing 50c having a circular opening 50h defined therein. The input/output shaft 51 that is rotatably supported by a bearing 52 projects forwardly through the circular opening 50h. The casing 50c has a plurality of axially arcuate engaging fingers 50cf arranged concentrically and projecting from a peripheral edge of the circular opening 50h in the casing 50c forwardly in an axial direction of the input/output shaft 51.

As illustrated in FIG. 5, the rear crankcase cover 25 that is stacked on the rear end face of the crankcase 21 includes a tubular portion 25a disposed in an upper left portion thereof (see FIG. 2) and having a rearward opening. The tubular portion 25a has an inner circumferential surface near its opening which is slightly cut off to form an engaging inner circumferential surface 25aa.

The axially arcuate engaging fingers 50cf projecting forwardly from the casing 50c of the starter generator 50 are fitted in the engaging inner circumferential surface 25aa in the tubular portion 25a of the rear crankcase cover 25 near its opening. The starter generator 50 is thus positioned and mounted on the tubular portion 25a of the rear crankcase cover 25.

The axially arcuate engaging fingers 50cf projecting forwardly from the casing 50c of the starter generator 50 include three engaging fingers spaced at circumferentially equal intervals. One of the engaging fingers is positioned directly above a front end portion of the input/output shaft 51, and projects axially forwardly from the casing 50c in axially arcuately covering relation to an upper portion of the front end portion of the input/output shaft 51.

Heat generated by the starter generator 50 can be radiated through the spaces between the three engaging fingers 50cf. Raindrops directly from above are prevented from falling directly on the input/output shaft 51, and water is restrained from entering as far as the input/output shaft 51.

Referring to FIG. 5, the tubular portion 25a of the rear crankcase cover 25 is closed by a slightly tapered bearing wall 25b having an open rear portion and a front portion in the form of a hollow circular plate.

The bearing wall 25b includes a tubular bearing portion 25c disposed centrally thereon.

An intermediate shaft 60 is rotatably supported in the tubular bearing portion 25c of the bearing wall 25b by a bearing 61.

The intermediate shaft 60 that is rotatably supported in the tubular bearing portion 25c by the bearing 61 has a rear end rotatably supported by a bearing 62 in a bearing recess 21Lh defined in the left cylinder portion 21L of the crankcase 21.

The front-stage power transmitting device $T_F$ is supported on the intermediate shaft 60 forwardly of the bearing wall 25b and disposed between the bearing wall 25b and the left cylinder portion 21L. The rear-stage power transmitting device $T_R$ is supported on the intermediate shaft 60 and the input/output shaft 51 within the tubular portion 25a of the rear crankcase cover 25 and disposed between the bearing wall 25b and the starter generator 50.

In addition to FIG. 5, referring to FIG. 6 that is an exploded perspective view of the front-stage power transmitting device $T_F$ and the rear-stage power transmitting device $T_R$ whose parts are illustrated as spaced along a rotational central axis Lc, the intermediate shaft 60 has a flange 60f disposed forwardly of a journal 60j that is supported by the bearing 61, with a serrated fitting portion 60sf formed near the front end thereof, and a serrated fitting portion 60sr formed on a rear end portion thereof.

The front-stage power transmitting device $T_F$ according to the present invention will be described below.

The front-stage power transmitting device $T_F$ includes an internal-combustion-engine-side rotor (a first rotor) 71 to which power from the internal combustion engine 20 is initially transmitted and a starter-generator-side rotor (a second rotor) 72 to which power from the starter generator 50 is initially transmitted. The internal-combustion-engine-side rotor 71 and the starter-generator-side rotor 72 of disk shapes having substantially the same diameter, have a first facing surface 71f and a second facing surface 72f, respectively, near and facing each other, and are rotatably supported on the intermediate shaft 60.

Figure 8:
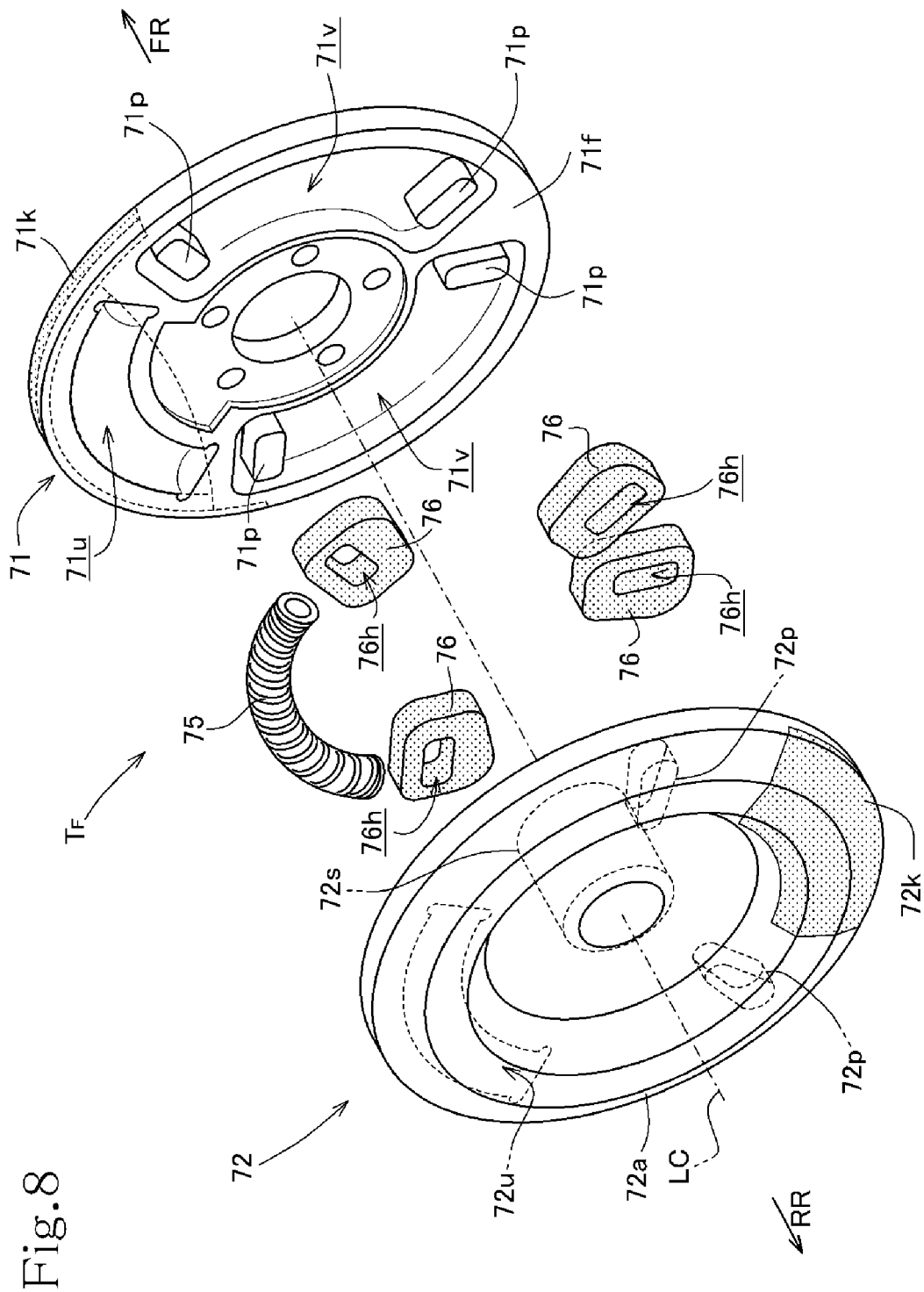
FIG. 8 is an exploded perspective view of a portion of the front-stage power transmitting device.
Figure 10:
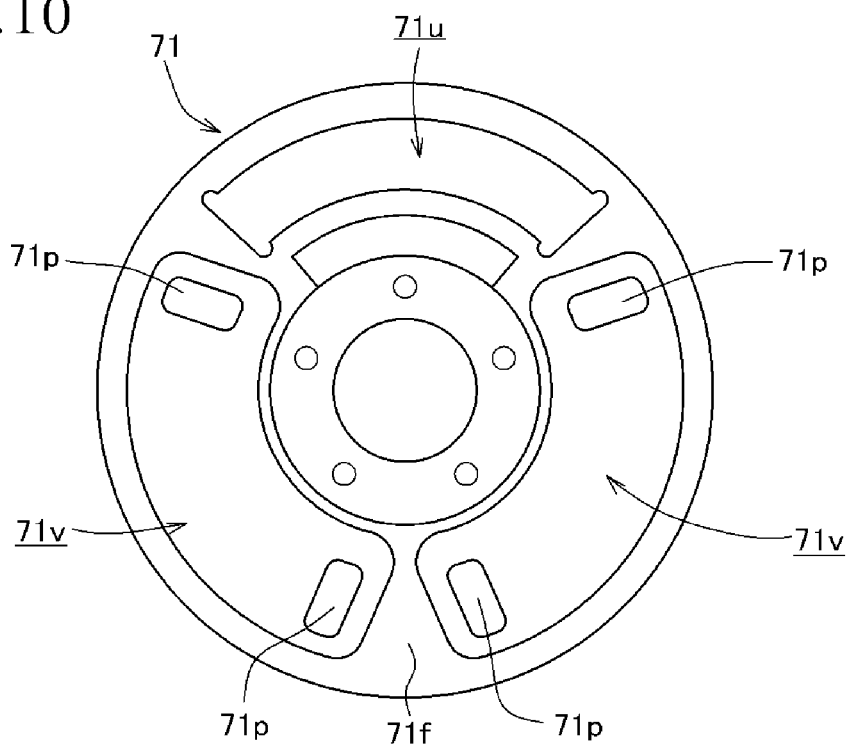
FIG. 10 is a rear elevational view of the internal-combustion-engine-side rotor of the front-stage power transmitting device.

As illustrated in FIGS. 8 and 10, the internal-combustion-engine-side rotor 71 has a circular hole defined centrally therein. The first facing surface 71f, which is of an annular shape, has an arcuately shaped first housing groove 71u defined therein that houses therein one-half of an arc spring 75 that is elastically deformable to a large extent and has a small modulus of elasticity, and a pair of arcuately shaped arcuate grooves 71v defined therein substantially concentrically with the first housing groove 71u.

A pair of internal-combustion-engine-side pressing protrusions (first pressing protrusions) 71p project rearwardly in each of the arcuate grooves 71v in the internal-combustion-engine-side rotor 71 respectively near circumferentially opposite ends of the arcuate grooves 71v.

The internal-combustion-engine-side pressing protrusions 71p are contained in each of the arcuate grooves 71v.

Figure 13:
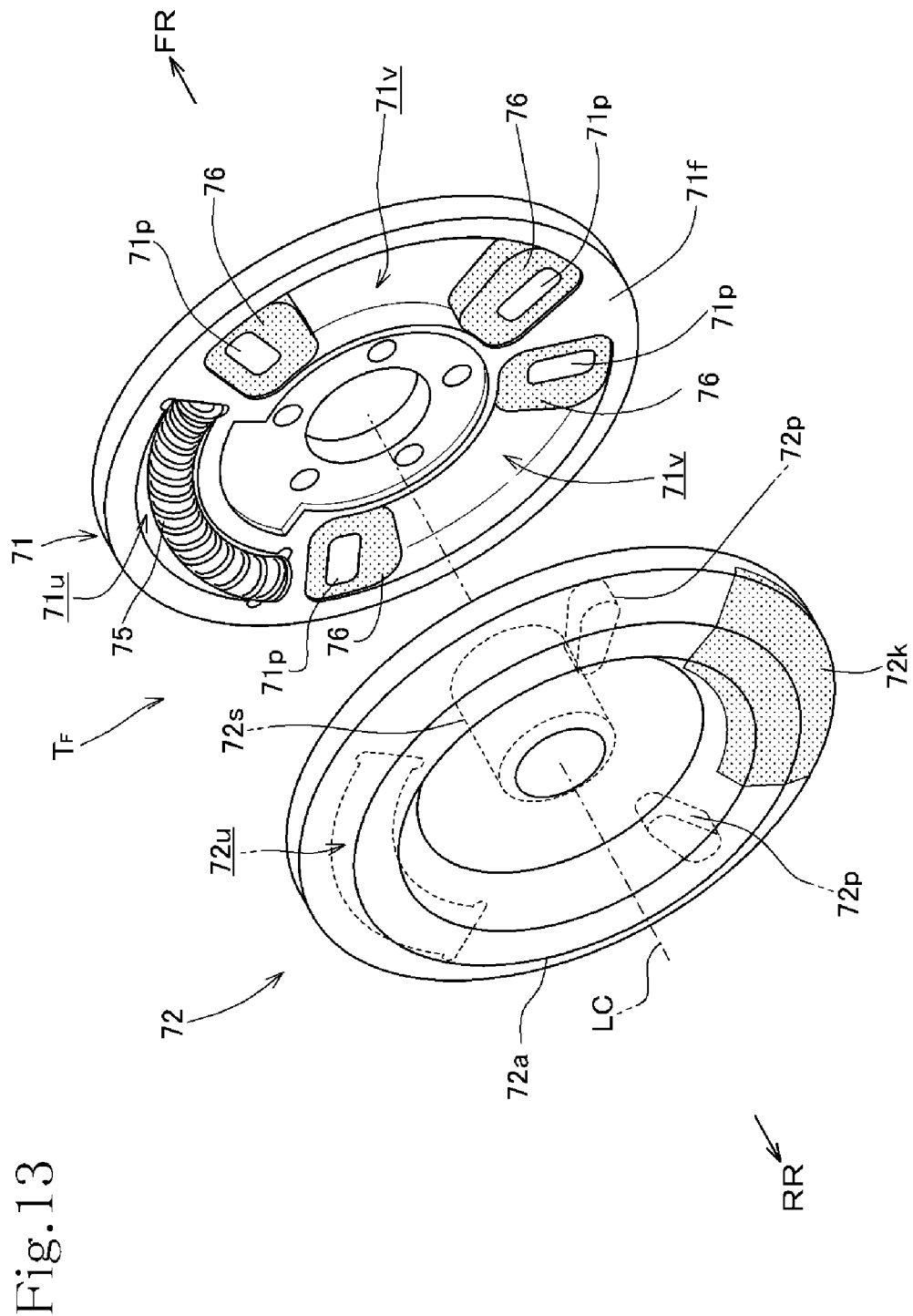
FIG. 13 is an exploded perspective view of a portion of the front-stage power transmitting device, with parts assembled together.

Referring to FIGS. 8 and 13, rubber members 76 that are elastically deformable to a small extent and have a large modulus of elasticity are mounted respectively on the internal-combustion-engine-side pressing protrusions 71p.

Each of the rubber members 76 is in the form of a flat columnar body that is of a sectorial shape as viewed axially, and has a fitting hole 76h defined axially therethrough that is slightly smaller than and similar in shape to the internal-combustion-engine-side pressing protrusion 71p.

The rubber members 76 are mounted on the respective internal-combustion-engine-side pressing protrusions 71p that are fitted respectively in the fitting holes 76h.

As illustrated in FIG. 13, when the rubber members 76 that are elastically deformable to a small extent and have a large modulus of elasticity are mounted respectively on the internal-combustion-engine-side pressing protrusions 71p, the rubber members 76 are fitted in the ends of the arcuate grooves 71v and completely housed in the arcuate grooves 71v.

One-half of the arc spring 75 that is elastically deformable to a large extent and has a small modulus of elasticity is housed in the arcuately shaped first housing groove 71u.

The internal-combustion-engine-side rotor 71 that is disk-shaped has a machining margin 71k (the stippled portion in FIG. 9) for unbalance adjustment behind the arcuately shaped first housing groove 71u that houses one-half of the arc spring 75 therein.

Since the internal-combustion-engine-side rotor 71 has the pair of arcuate grooves 71v opposite the first housing groove 71u across the rotational central axis Lc, the internal-combustion-engine-side rotor 71 tends to be unbalanced as it is heavier on the side of the first housing groove 71u. The machining margin 71k for unbalance adjustment behind the arcuately shaped first housing groove 71u is cut off to reduce the unbalance, allowing the internal-combustion-engine-side rotor 71 to be balanced to thereby restrain itself from being vibrated due to the unbalance.

Figure 11:
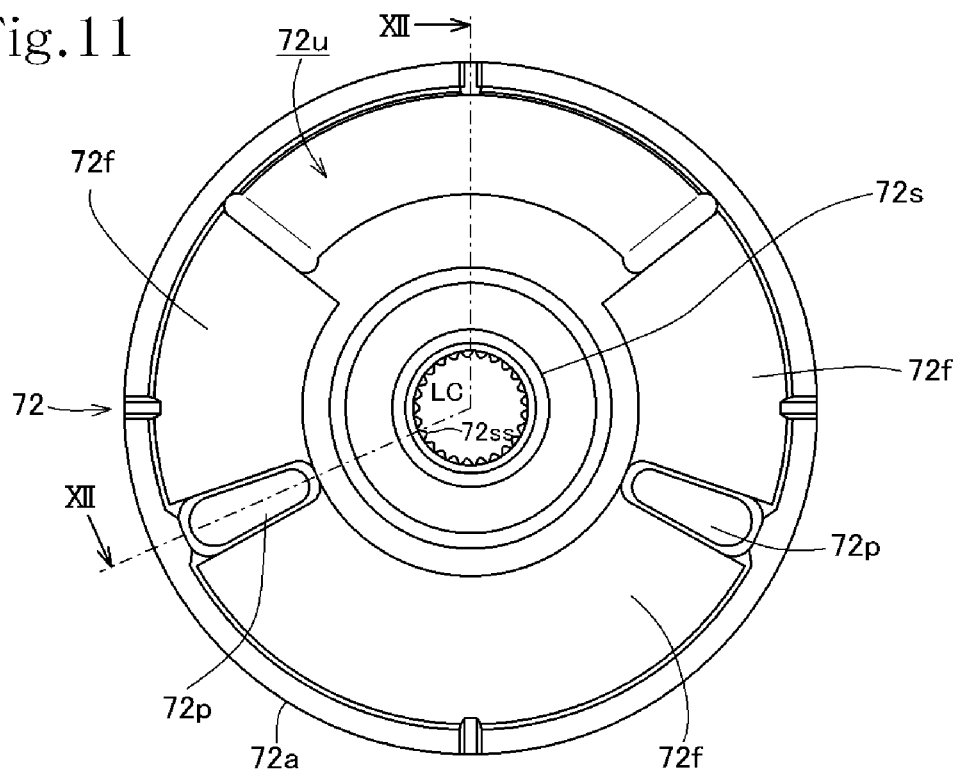
FIG. 11 is a front elevational view of a starter-generator-side rotor of the front-stage power transmitting device.
Figure 12:
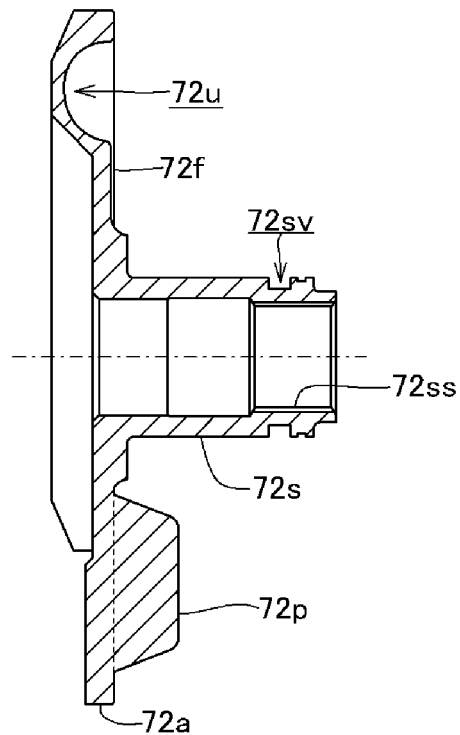
FIG. 12 is a cross-sectional view of the starter-generator-side rotor taken along line XII-XII of FIG. 11.

As illustrated in FIGS. 11 and 12, the disk-shaped starter-generator-side rotor 72 of the front-stage power transmitting device $T_F$ includes a disk 72a and a tubular shaft 72s projecting forwardly from the center of the disk 72a.

The tubular shaft 72s has serrations 72ss on a front end portion of an inner circumferential surface thereof and an outer circumferential groove 72sv defined in an outer circumferential surface thereof in the vicinity of the front end thereof.

The disk 72a of the starter-generator-side rotor 72 has an arcuate second housing groove 72u defined in the second facing surface 72f for housing one-half of the arc spring 75 therein.

The second housing groove 72u has the same circumferential length as the first housing groove 71u of the internal-combustion-engine-side rotor 71.

Starter-generator-side pressing protrusions (second pressing protrusions) 72p project forwardly from the second facing surface 72f of the disk 72a at respective two locations that are circumferentially spaced from the circumferential center of the second housing groove 72u such that they divide the circumference into about three equal lengths.

The disk 72a of the starter-generator-side rotor 72 has a machining margin 72k (the stippled portions in FIGS. 8 and 13) for unbalance adjustment on a rear surface thereof opposite the arcuate second housing groove 72u that houses one-half of the arc spring 75 across the rotational central axis Lc.

Since the disk 72a of the starter-generator-side rotor 72 tends to be unbalanced as it is heavier on the side opposite the second housing groove 72u across the rotational central axis Lc on account of the second housing groove 72u, the machining margin 72k for unbalance adjustment is disposed opposite the second housing groove 72u and cut off to reduce the unbalance, allowing the starter-generator-side rotor 72 to be balanced to thereby restrain itself from being vibrated due to the unbalance.

As illustrated in FIG. 13, the first housing groove 71u in the internal-combustion-engine-side rotor 71 and the second housing groove 72u in the starter-generator-side rotor 72, which house the arc spring 75 therein, are brought together into facing relation to each other, causing the first facing surface 71f and the second facing surface 72f to confront each other, and the starter-generator-side pressing protrusions 72p project from nearly circumferentially central portions of arcuate areas of the second facing surface 72f that correspond to the arcuate grooves 71v in the internal-combustion-engine-side rotor 71.

Specifically, the starter-generator-side pressing protrusions 72p are disposed in respective positions that correspond to substantially central portions of the arcuate grooves 71v between the internal-combustion-engine-side pressing protrusions 71p near the circumferentially opposite ends of the arcuate grooves 71v.

Figure 14:
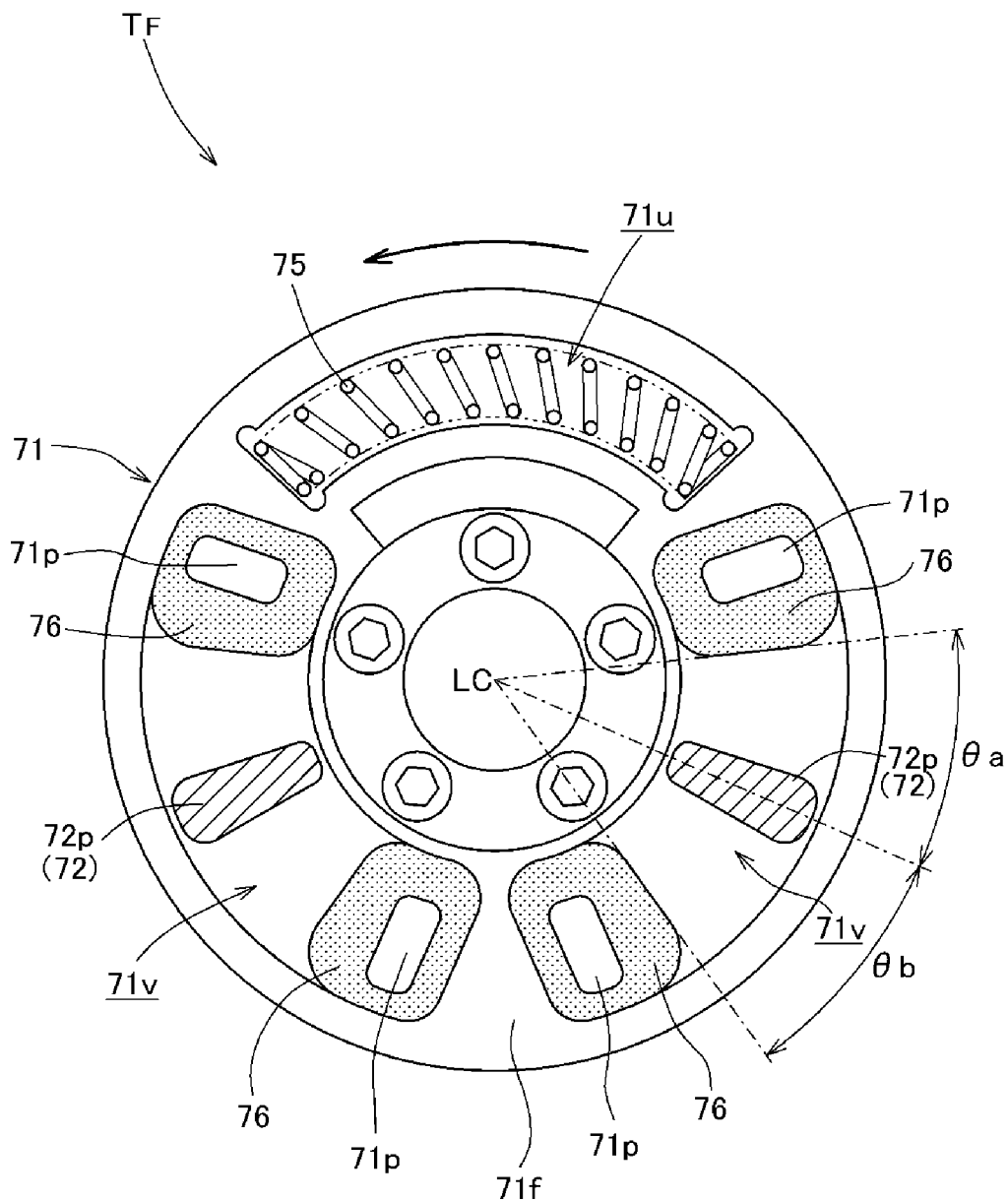
FIG. 14 is a cross-sectional view of the front-stage power transmitting device as viewed forwardly (toward the internal-combustion-engine-side rotor) from a sectional plane between the internal-combustion-engine-side rotor and the starter-generator-side rotor.

Therefore, when the first housing groove 71u and the second housing groove 72u that house the arc spring 75 therein are brought together into facing relation to each other, with the internal-combustion-engine-side rotor 71 and the starter-generator-side rotor 72 assembled closely together, no relative torque load is applied to the internal-combustion-engine-side rotor 71 and the starter-generator-side rotor 72. As illustrated in FIG. 14, the starter-generator-side pressing protrusions 72p are inserted respectively into the arcuate grooves 71v in the internal-combustion-engine-side rotor 71 and positioned substantially centrally between the paired internal-combustion-engine-side pressing protrusions 71p. The internal-combustion-engine-side pressing protrusions 71p and the starter-generator-side pressing protrusions 72p are disposed in relative positions on superposed rotation trajectories.

FIG. 14 is a cross-sectional view of the front-stage power transmitting device $T_F$ as viewed forwardly (toward the internal-combustion-engine-side rotor 71) from a sectional plane between the first facing surface 71f of the internal-combustion-engine-side rotor 71 and the second facing surface 72f of the starter-generator-side rotor 72, with the internal-combustion-engine-side rotor 71 and the starter-generator-side rotor 72 assembled closely together. The starter-generator-side pressing protrusions 72p projecting from the second facing surface 72f of the starter-generator-side rotor 72 are illustrated in cross section.

As illustrated in FIG. 14, when no relative torque load is applied to the internal-combustion-engine-side rotor 71 and the starter-generator-side rotor 72, the starter-generator-side pressing protrusions 72p are positioned substantially centrally between the paired rubber members 76 mounted on the respective paired internal-combustion-engine-side pressing protrusions 71p. More accurately, an angle θa from each of the starter-generator-side pressing protrusions 72p to one of the corresponding paired rubber members 76 spaced therefrom in the direction of rotation, as indicated by the arrow in FIG. 14, is smaller than an angle θb from the starter-generator-side pressing protrusion 72p to the other rubber member 76 spaced therefrom in the direction opposite the direction of rotation.

In other words, when no relative torque load is applied to the internal-combustion-engine-side rotor 71 and the starter-generator-side rotor 72, the starter-generator-side pressing protrusions 72p are positioned closer to those rubber members 76 that are spaced therefrom in the direction of rotation.

Referring to FIGS. 5 and 6, for assembling the internal-combustion-engine-side rotor 71 and the starter-generator-side rotor 72 so as to be rotatably supported on the intermediate shaft 60, a small-diameter helical gear 33 is held against a front side of the internal-combustion-engine-side rotor 71 with the rubber members 76 mounted on the internal-combustion-engine-side pressing protrusions 71p, and mounting bolts 34 are inserted from behind respectively through circumferentially spaced five mounting holes defined in an inner circumferential portion of the internal-combustion-engine-side rotor 71 and threaded into threaded holes in the small-diameter helical gear 33, integrally mounting the small-diameter helical gear 33 on the internal-combustion-engine-side rotor 71.

The small-diameter helical gear 33 is a helical gear with a left-hand thread helix, and is held in mesh with the large-diameter helical gear 32 that is secured to the crankshaft 30.

The left-hand thread helix refers to threads helically oriented to the left and the upper as viewed in front elevation.

The tubular shaft 72s of the disk-shaped starter-generator-side rotor 72 is inserted from behind through central axial holes in the internal-combustion-engine-side rotor 71 and the small-diameter helical gear 33 that are integrally combined with each other. The disk 72a is superposed on the internal-combustion-engine-side rotor 71 with the arc spring 75 interposed therebetween, and the second facing surface 72f of the disk-shaped starter-generator-side rotor 72 is brought into closely facing relation to the first facing surface 71f of the internal-combustion-engine-side rotor 71.

The internal-combustion-engine-side rotor 71 and the small-diameter helical gear 33 are slidably and rotatably supported on the tubular shaft 72s of the disk-shaped starter-generator-side rotor 72.

A disk spring 35, a collar 36, and a stopper 37 are placed successively in the order named on a portion of the tubular shaft 72s of the disk-shaped starter-generator-side rotor 72 that projects forwardly from the internal-combustion-engine-side rotor 71.

Specifically, the disk spring 35 is interposed between the collar 36 that is prevented from moving forwardly by the stopper 37 that is fitted in the outer circumferential groove 72sv defined in the tubular shaft 72s, and the small-diameter helical gear 33. The internal-combustion-engine-side rotor 71 together with the small-diameter helical gear 33 is normally urged by the disk spring 35 to move toward the disk-shaped starter-generator-side rotor 72.

The stopper 37 fitted in the outer circumferential groove 72sv is covered with a dislodgment prevention retainer 38, which is prevented from moving by a circlip 39.

The intermediate shaft 60 is inserted from behind into the tubular shaft 72s of the disk-shaped starter-generator-side rotor 72 of the assembly of the internal-combustion-engine-side rotor 71 and the starter-generator-side rotor 72 thus assembled. When the intermediate shaft 60 is inserted until the flange 60f thereof abuts against the rear end of the tubular shaft 72s, the serrated fitting portion 60sf near the front end of the intermediate shaft 60 is brought into fitting relation to the serrations 72ss on the front end portion of the inner circumferential surface of the tubular shaft 72s.

Therefore, the disk-shaped starter-generator-side rotor 72 and the intermediate shaft 60 are rotatable in unison with each other.

Referring to FIG. 5, the intermediate shaft 60 on which the assembly of the internal-combustion-engine-side rotor 71 and the starter-generator-side rotor 72 is supported has its front end rotatably supported in the bearing recess 21Lh defined in the left cylinder portion 21L by the bearing 62. A portion of the intermediate shaft 60 that is forward of the flange 60f is rotatably supported by the bearing 61 in the tubular bearing portion 25c of the bearing wall 25b of the rear crankcase cover 25. The small-diameter helical gear 33 that is integrally combined with the internal-combustion-engine-side rotor 71 is held in mesh with the large-diameter helical gear 32 that is secured to the crankshaft 30.

The bearing 61 that is fitted into the tubular bearing portion 25c of the bearing wall 25b from its front has an outer race that is pressed from its front by a pressing plate 63 that is fixed to the bearing wall 25b by bolts 64.

In this manner, as illustrated in FIG. 5, the internal-combustion-engine-side rotor 71 and the starter-generator-side rotor 72 of the front-stage power transmitting device $T_F$ are supported on the intermediate shaft 60 and assembled together.

Power is transmitted between the internal-combustion-engine-side rotor 71 and the crankshaft 30 of the internal combustion engine 20 through the small-diameter helical gear 33 and the large-diameter helical gear 32 that are held in mesh with each other.

Power is transmitted between the intermediate shaft 60 that rotates in unison with the starter-generator-side rotor 72 and the input/output shaft 51 of the starter generator 50 through the rear-stage power transmitting device TR to be described later.

The single arc spring 75 that is elastically deformable to a large extent and has a small modulus of elasticity and the four rubber members 76 that are elastically deformable to a small extent and have a large modulus of elasticity, which urge the internal-combustion-engine-side rotor 71 and the starter-generator-side rotor 72 in their directions of relative rotation, are interposed between the internal-combustion-engine-side rotor 71 and the starter-generator-side rotor 72.

While no relative torque load is being applied to the internal-combustion-engine-side rotor 71 and the starter-generator-side rotor 72, the first housing groove 71u in the internal-combustion-engine-side rotor 71 and the second housing groove 72u in the starter-generator-side rotor 72 that house the arc spring 75 therein are aligned with each other, and the starter-generator-side pressing protrusions 72p are disposed substantially centrally between the rubber members 76 mounted on the paired internal-combustion-engine-side pressing protrusions 71p, as illustrated in FIG. 14.

Figure 15:
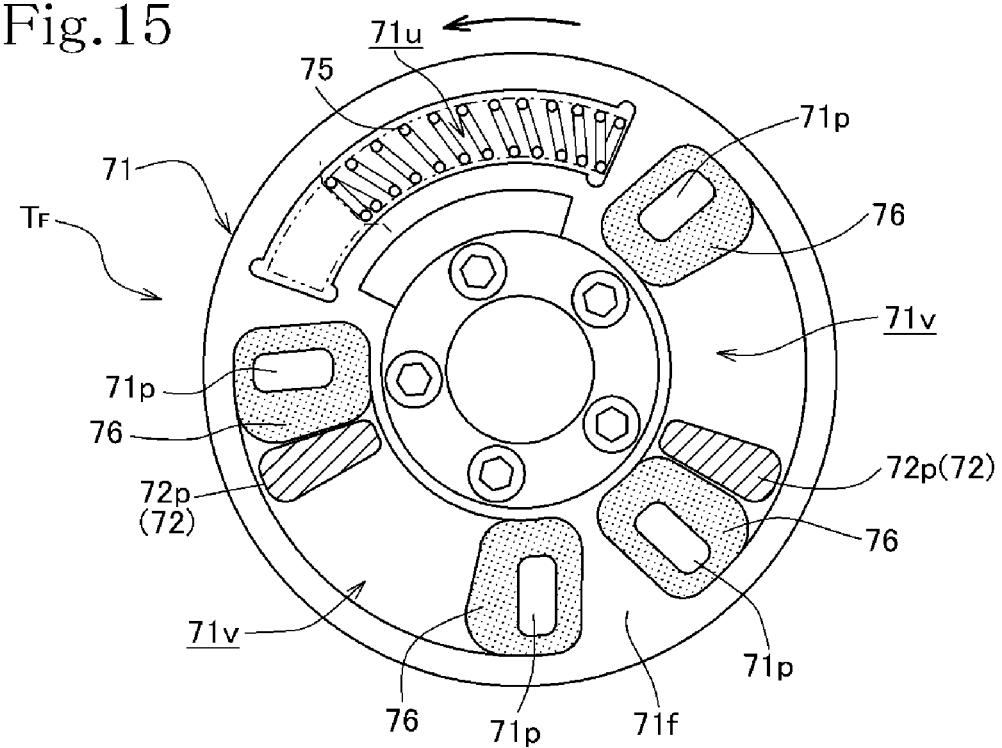
FIG. 15 is a cross-sectional view of the front-stage power transmitting device under a low torque load applied when the internal combustion engine is in normal operation.

Under a low torque load applied to the internal-combustion-engine-side rotor 71 and the starter-generator-side rotor 72, causing them to rotate at a small rotational speed difference when the internal combustion engine 20 is in normal operation, as illustrated in FIG. 15, the arc spring 75 is compressively deformed, and the rubber members 76 mounted on those internal-combustion-engine-side pressing protrusions 71p which are positioned on the opposite side of the direction of rotation come closer to the starter-generator-side pressing protrusions 72p. Consequently, the arc spring 75 that is elastically deformable to a large extent and has a small modulus of elasticity absorb a smaller shock for smooth power transmission.

Under a high torque load applied to the internal-combustion-engine-side rotor 71 and the starter-generator-side rotor 72, causing them to rotate at a large rotational speed difference when the internal combustion engine 20 is operated for quick acceleration, the arc spring 75 is further compressively deformed from the state illustrated in FIG. 15, and the rubber members 76 mounted on those internal-combustion-engine-side pressing protrusions 71p which are positioned on the opposite side of the direction of rotation are brought into contact with the starter-generator-side pressing protrusions 72p and pinched between the starter-generator-side pressing protrusions 72p and the internal-combustion-engine-side pressing protrusions 71p. Consequently, the rubber members 76 that are elastically deformable to a small extent and have a large modulus of elasticity are compressively deformed, absorbing a larger shock.

Figure 16:
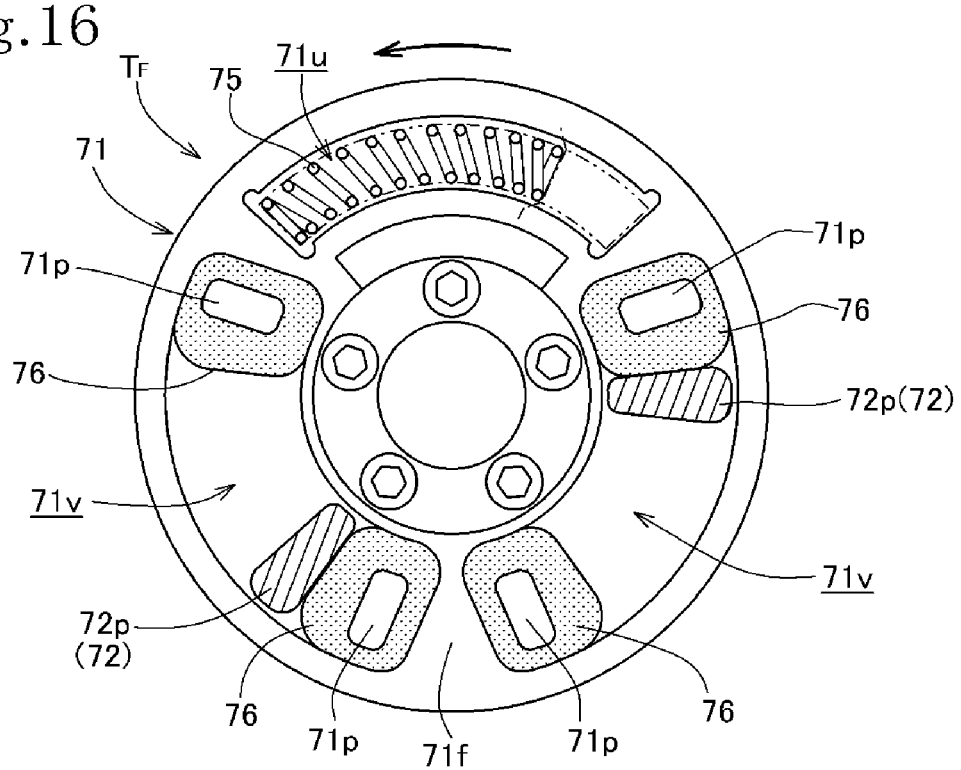
FIG. 16 is a cross-sectional view of the front-stage power transmitting device under a high torque load applied when the internal combustion engine is started, etc.

When the internal combustion engine 20 is started or stalled, a large torque load is applied to the internal-combustion-engine-side rotor 71 and the starter-generator-side rotor 72 through the intermediate shaft 60, causing them to rotate at a large rotational speed difference. As illustrated in FIG. 16, the arc spring 75 is compressively deformed from the state, the starter-generator-side pressing protrusions 72p approach and contact the rubber members 76 mounted on those internal-combustion-engine-side pressing protrusions 71p which are positioned on the same side of the direction of rotation. The rubber members 76 are then pinched between the starter-generator-side pressing protrusions 72p and the internal-combustion-engine-side pressing protrusions 71p. Consequently, the rubber members 76 that are elastically deformable to a small extent and have a large modulus of elasticity are compressively deformed, absorbing a larger shock.

The rear-stage power transmitting device $T_R$ will be described below.

As illustrated in FIG. 5, the front-stage power transmitting device $T_F$ includes an internal-combustion-engine-side rotor 81 to which power from the internal combustion engine 20 is initially transmitted and a starter-generator-side rotor 82 to which power from the starter generator 50 is directly transmitted. The internal-combustion-engine-side rotor 81 and the starter-generator-side rotor 82 are disposed in facing relation to each other.

The internal-combustion-engine-side rotor 81 is integrally supported on the intermediate shaft 60. The starter-generator-side rotor 82 is integrally supported on the input/output shaft 51 of the starter generator 50.

Figure 17:
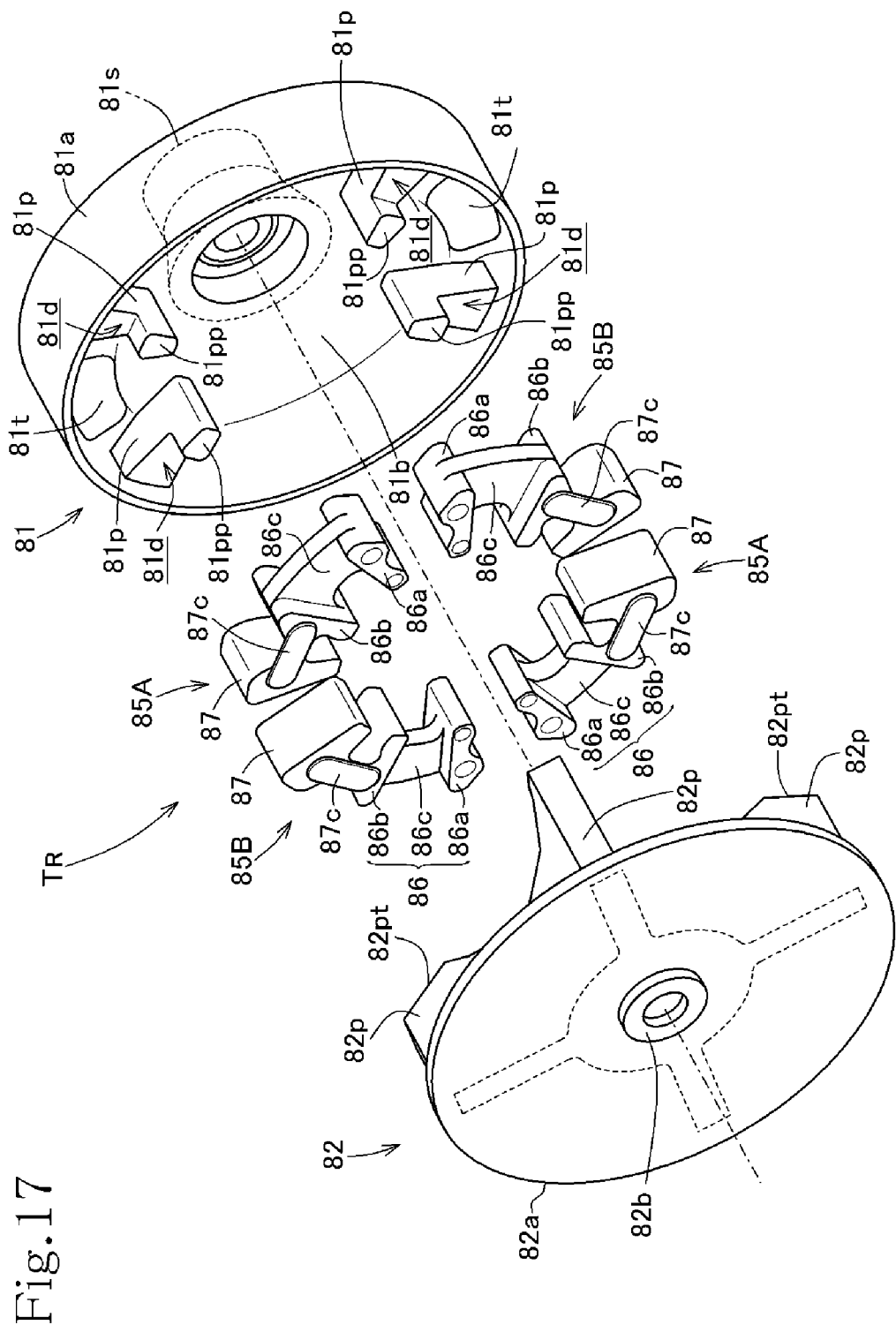
FIG. 17 is an exploded perspective view of a portion of the rear-stage power transmitting device.
Figure 18:
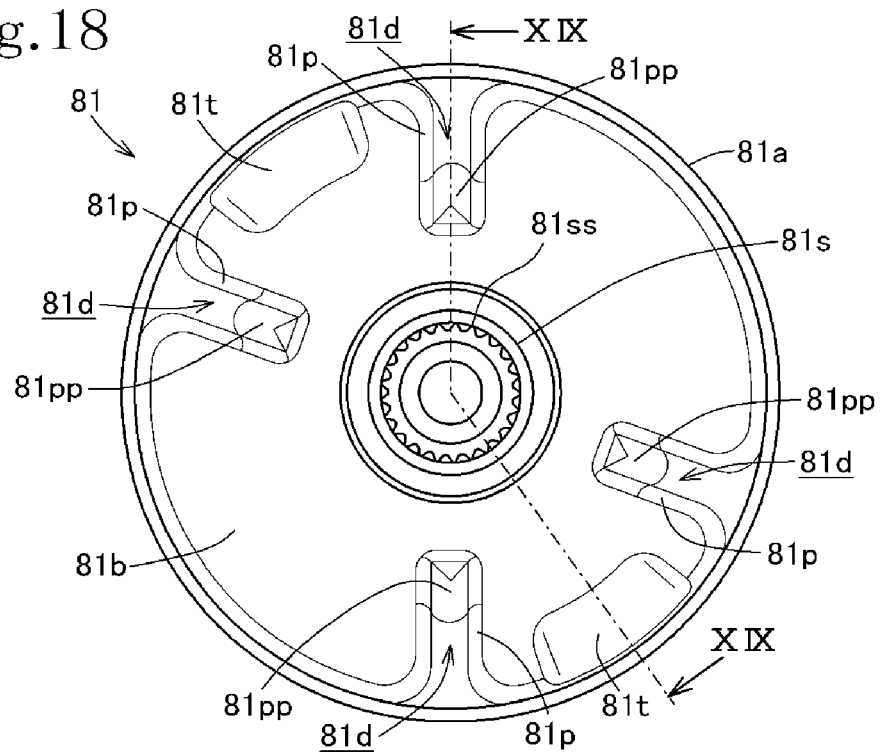
FIG. 18 is a front elevational view of an internal-combustion-engine-side rotor of the rear-stage power transmitting device.
Figure 19:
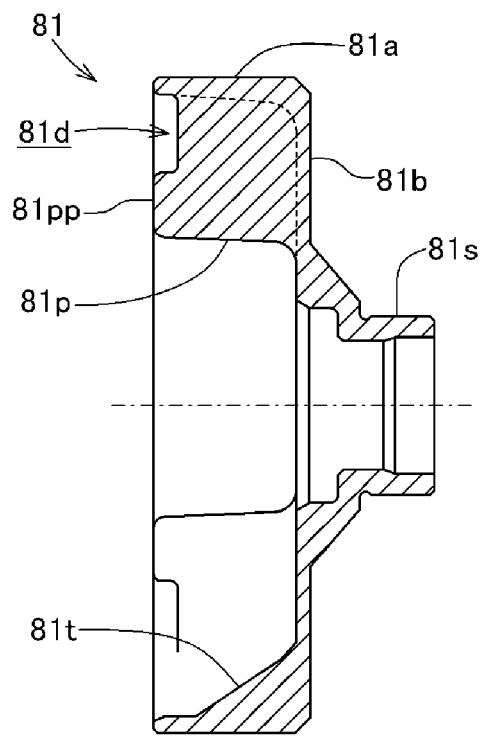
FIG. 19 is a cross-sectional view of the internal-combustion-engine-side rotor taken along line XIX-XIX of FIG. 18.

Referring to FIGS. 17 through 19, the internal-combustion-engine-side rotor 81 includes a flat tubular portion 81a, a bottom wall 81b closing a front opening of the tubular portion 81a, and a tubular shaft 81s projecting forwardly from the center of the bottom wall 81b.

The tubular shaft 81s has serrations 81ss on a front end portion of an inner circumferential surface thereof.

Internal-combustion-engine-side pressing protrusions 81p, at predetermined four locations of a bottom surface of the bottom wall 8b, project forwardly from an inner circumferential surface of the tubular portion 81a as radially oriented plates.

The internal-combustion-engine-side pressing protrusions 81p include two narrowly spaced internal-combustion-engine-side pressing protrusions 81p and other two narrowly spaced internal-combustion-engine-side pressing protrusions 81p that are positioned in symmetric relation to the first-mentioned narrowly spaced internal-combustion-engine-side pressing protrusions 81p across the rotational central axis Lc.

The radially oriented internal-combustion-engine-side pressing protrusions 81p include respective projections 81pp projecting axially rearwardly from their sides near the rotational central axis Lc.

The projections 81pp have projecting end faces lying flush with an open end face of the tubular portion 81a. The internal-combustion-engine-side pressing protrusions 81p have respective recesses 81d defined between the projections 81pp and the tubular portion 81a.

Between the narrowly spaced internal-combustion-engine-side pressing protrusions 81p of the internal-combustion-engine-side rotor 81, there are disposed lands 81t raised on outer circumferential portions of sectorial wall surfaces of the bottom wall 81b. The lands 81t have tapered surfaces on end faces thereof except areas near the internal-combustion-engine-side pressing protrusions 81p on both sides thereof.

The lands 81t are spaced from the internal-combustion-engine-side pressing protrusions 81p on both sides thereof by gaps.

A rubber structural body 85A or a rubber structural body 85B is mounted and fixedly supported on each of the internal-combustion-engine-side pressing protrusions 81p of the internal-combustion-engine-side rotor 81.

Each of the rubber structural body 85A and the rubber structural body 85B includes a soft rubber member 86 that is elastically deformable to a large extent and has a small modulus of elasticity and a hard rubber member 87 that is elastically deformable to a small extent and has a large modulus of elasticity. The soft rubber member 86 and the hard rubber member 87 are integrally formed with each other. The rubber structural body 85A and the rubber structural body 85B have symmetrical shapes and structures.

The rubber structural body 85A will be described below with reference to FIGS. 20 and 21.

Figure 20:
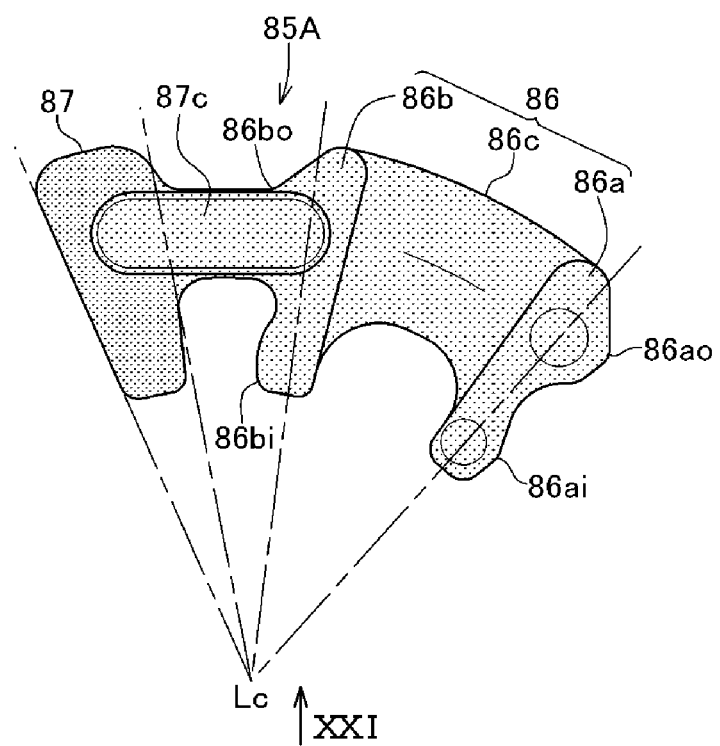
FIG. 20 is a rear elevational view of a rubber structural body.
Figure 21:
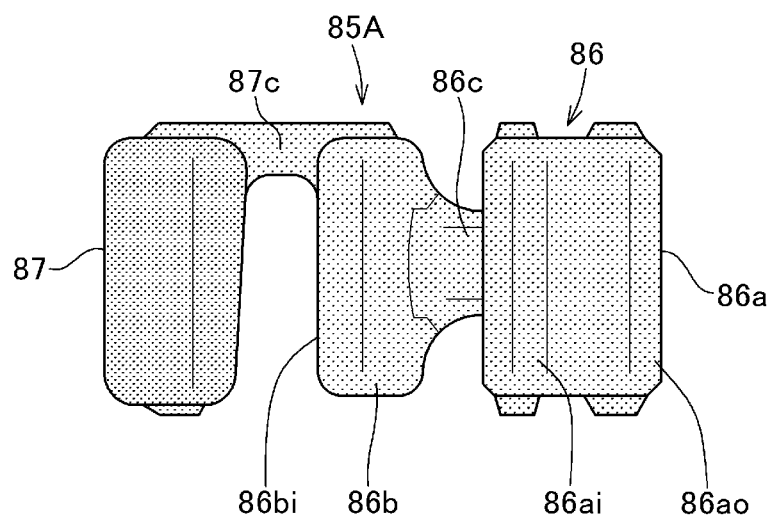
FIG. 21 is a view of the rubber structural body as viewed along arrow XXI of FIG. 20.

FIG. 20 is a rear elevational view of the rubber structural body, and FIG. 21 is a view of the rubber structural body as viewed along arrow XXI of FIG. 20.

The soft rubber member 86 (the sparsely stippled portions in FIGS. 20 and 21) of the rubber structural body 85A includes a pair of circumferentially spaced, radially elongate end side portions 86a and 86b and an interconnecting web 86c interconnecting the end side portions 86a and 86b, as viewed axially along the rotational central axis Lc in FIG. 20 (as viewed in rear elevation). The soft rubber member 86 is of a sectorial shape as viewed axially along the rotational central axis Lc.

The interconnecting web 86c interconnect the end side portions 86a and 86b on radially outward sides thereof except for sides thereof closer to the rotational central axis Lc.

Furthermore, the interconnecting web 86c is thinner than the end side portions 86a and 86b along the axial directions of the rotational central axis Lc (see FIG. 21).

The end side portions 86a and 86b of the soft rubber member 86 have respective inner end protrusions 86ai and 86bi projecting in the direction of rotation from radially inner ends thereof near the rotational central axis, and also have respective outer end protrusions 86ao and 86bo projecting in the direction of rotation from radially outer ends thereof.

The hard rubber member 87 (densely stippled portions in FIGS. 20 and 21) of the rubber structural body 85A is of a sectorial shape that spreads to a small degree, as viewed axially along the rotational central axis Lc.

The hard rubber member 87 is positioned circumferentially next to the end side portion 86b of the end side portions 86a and 86b of the soft rubber member 86. The end side portion 86b and the hard rubber member 87 are connected to each other by a connecting rubber web 87c near outer ends thereof.

The connecting rubber web 87c connects the end side portion 86b and the hard rubber member 87 to each other at an axially rear position (see FIG. 21).

As illustrated in FIG. 17, the other rubber structural body 85B is shaped in mirror symmetry relation to the rubber structural body 85A.

Therefore, the parts of the soft rubber member 86 and the hard rubber member 87 of the rubber structural body 85B are denoted by reference characters identical to those of the rubber structural body 85A.

Figure 24:
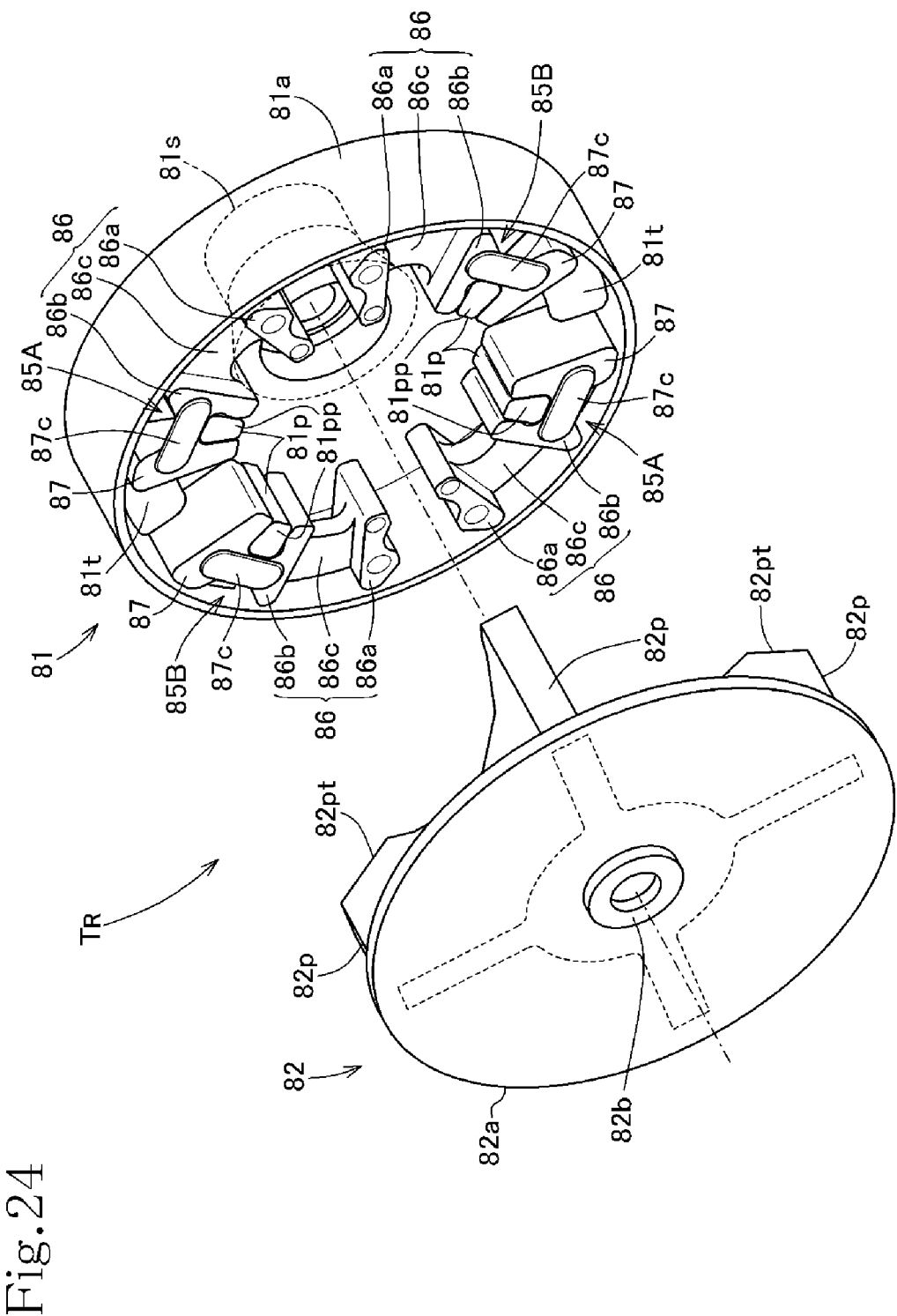
FIG. 24 is an exploded perspective view of a portion of the rear-stage power transmitting device, with parts assembled together.

As illustrated in FIG. 24, the rubber structural bodies 85A and the rubber structural bodies 85B are mounted respectively on the narrowly spaced internal-combustion-engine-side pressing protrusions 81p that project inwardly from the tubular portion 81a of the internal-combustion-engine-side rotor 81.

Referring to FIGS. 17 and 24, the end side portions 86b of the soft rubber members 86 and the hard rubber members 87 which are next to each other and connected by the connecting rubber webs 87c pinch the internal-combustion-engine-side pressing protrusions 81p, respectively. The rubber structural bodies 85A and the rubber structural bodies 85B are mounted respectively on the narrowly spaced internal-combustion-engine-side pressing protrusions 81p under the pinching pressure due to the elastic forces from the connecting rubber webs 87c.

Therefore, as illustrated in FIG. 24, the rubber structural bodies 85A and the rubber structural bodies 85B are reliably secured to and mounted respectively on the internal-combustion-engine-side pressing protrusions 81p.

The connecting rubber webs 87c are fitted in the respective recesses 81d defined between the projections 81pp of the internal-combustion-engine-side pressing protrusions 81p and the tubular portion 81a. The projections 81pp are pinched between the end side portions 86b of the soft rubber members 86 and the hard rubber members 87.

The rubber structural bodies 85A and the rubber structural bodies 85B are mounted in position such that the hard rubber members 87 are positions inside of the narrowly spaced internal-combustion-engine-side pressing protrusions 81p.

The hard rubber members 87 are fitted in gaps between the lands 81t raised between the narrowly spaced internal-combustion-engine-side pressing protrusions 81p and the internal-combustion-engine-side pressing protrusions 81p.

Figure 22:
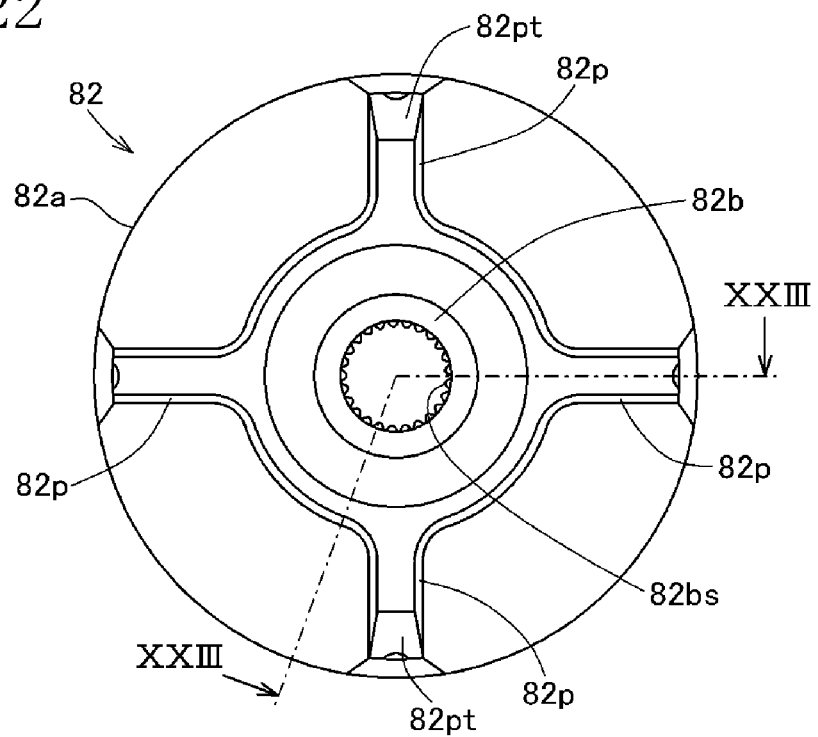
FIG. 22 is a rear elevational view of a starter-generator-side rotor of the rear-stage power transmitting device.
Figure 23:
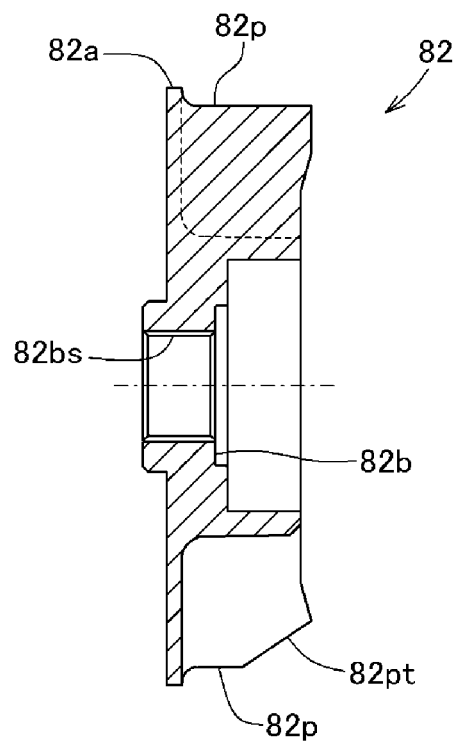
FIG. 23 is a cross-sectional view of the starter-generator-side rotor taken along line XXIII-XXIII of FIG. 22.

As illustrated in FIGS. 22, 23, and 24, the starter-generator-side rotor 82 of the rear-stage power transmitting device $T_R$ includes a disk 82a having a tubular boss 82b disposed centrally thereon around the rotational central axis Lc and four plate-like starter-generator-side pressing protrusions 82p circumferentially spaced at equal intervals and projecting forwardly from front face portions of the disk 82a that extend radially outwardly of the tubular boss 82b.

The tubular boss 82b has serrations 82bs on an inner circumferential surface thereof.

Each of the starter-generator-side pressing protrusions 82p is in the form of a substantially rectangular plate. Of the starter-generator-side pressing protrusions 82p, a pair of starter-generator-side pressing protrusions 82p that are symmetrical with respect to the rotational central axis Lc have respective outer circumferential front end portions obliquely cut into bevels 82pt.

The bevels 82pt of the starter-generator-side pressing protrusions 82p correspond respectively to the lands 81t of the internal-combustion-engine-side rotor 81, lying clear of the lands 81t to avoid physical interference therewith.

Referring to FIG. 5, with the rubber structural body 85A and the rubber structural body 85B mounted on the internal-combustion-engine-side pressing protrusions 81p, the tubular shaft 81s of the internal-combustion-engine-side rotor 81 is fitted through the serrations over the rear end portion, which projects rearwardly of the bearing 61, of the intermediate shaft 60 that is rotatably supported in the tubular bearing portion 25c of the rear crankcase cover 25 by the bearing 61.

A seal ring 65 is interposed between the tubular shaft 81s and the tubular bearing portion 25c.

Then, a mounting bolt 66 is threaded from behind into a threaded hole 60h that is open in a rear end face of the intermediate shaft 60, with a washer 67 interposed therebetween, fastening the tubular shaft 81s of the internal-combustion-engine-side rotor 81 together with an inner race of the bearing 61 against the flange 60f of the intermediate shaft 60. The internal-combustion-engine-side rotor 81 is thus fixed to the intermediate shaft 60 and supported thereon for rotation in unison therewith.

Referring to FIGS. 5 and 6, the tubular boss 82b of the starter-generator-side rotor 82 is fitted through the serrations over the front end portion of the input/output shaft 51 that projects from the circular opening 50h in the casing 50c of the starter generator 50.

A mounting bolt 68 is threaded from behind into a threaded hole 51h that is open in a front end face of the input/output shaft 51, with a washer 69 interposed therebetween, fastening the tubular boss 82b to the front end portion of the input/output shaft 51. The starter-generator-side rotor 82 is thus fixed to the input/output shaft 51 and supported thereon for rotation in unison therewith.

With the starter-generator-side rotor 82 mounted on the input/output shaft 51 of the starter generator 50, the starter generator 50 is attached to the tubular portion 25a of the rear crankcase cover 25.

At this time, the engaging fingers 50cf projecting forwardly from the casing 50c of the starter generator 50 are fitted against the engaging inner circumferential surface 25aa of the tubular portion 25a of the rear crankcase cover 25 near its opening, thereby positioning the starter generator 50 to align the input/output shaft 51 coaxially with the intermediate shaft 60.

For attaching the starter generator 50 to the tubular portion 25a of the rear crankcase cover 25, it is necessary to combine the starter-generator-side rotor 82 with the internal-combustion-engine-side rotor 81 at a predetermined relative rotational angle.

Specifically, the starter-generator-side rotor 82 is combined with the internal-combustion-engine-side rotor 81 at such a relative rotational angle that the starter-generator-side pressing protrusions 82p with the bevels 82pt of the starter-generator-side rotor 82 are inserted between the hard rubber members 87 of the rubber structural bodies 85A and the hard rubber members 87 of the rubber structural bodies 85B that are disposed inside of the narrowly spaced internal-combustion-engine-side pressing protrusions 81p of the internal-combustion-engine-side rotor 81.

Figure 25:
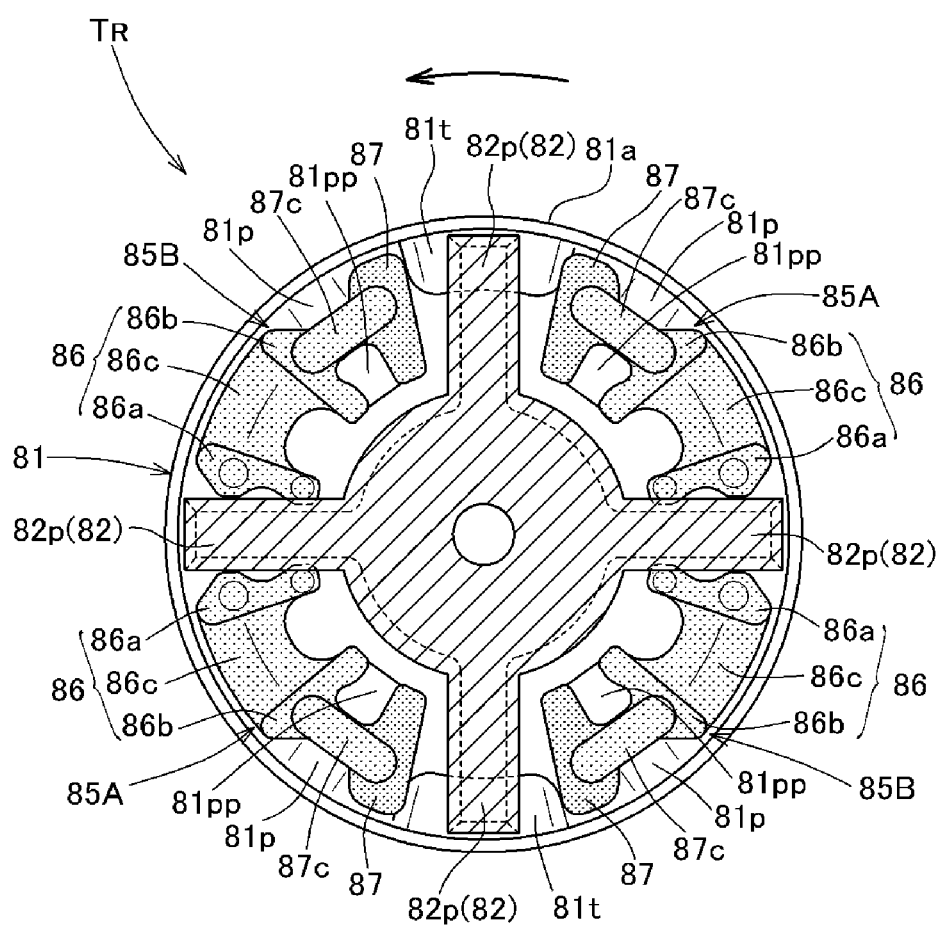
FIG. 25 is a cross-sectional view of the rear-stage power transmitting device as viewed forwardly (toward the internal-combustion-engine-side rotor) from a sectional plane between the internal-combustion-engine-side rotor and the starter-generator-side rotor.

FIG. 25 is a cross-sectional view of the rear-stage power transmitting device $T_F$ as viewed forwardly (toward the internal-combustion-engine-side rotor 71) from a sectional plane between the disk 82a of the internal-combustion-engine-side rotor 81 and the tubular portion 81a of the starter-generator-side rotor 72, with the internal-combustion-engine-side rotor 81 and the starter-generator-side rotor 82 being combined with each other. The starter-generator-side pressing protrusions 82p projecting from the disk 82a of the internal-combustion-engine-side rotor 81 and the tubular boss 82b are illustrated in cross section.

Referring to FIG. 25, the starter-generator-side pressing protrusions 82p with the bevels 82pt of the internal-combustion-engine-side rotor 81 are inserted between the hard rubber members 87 of the rubber structural bodies 85A and the hard rubber members 87 of the rubber structural bodies 85B with gaps therebetween without physical interference with the lands 81t of the internal-combustion-engine-side rotor 81.

The starter-generator-side pressing protrusions 82p without bevels of the internal-combustion-engine-side rotor 81 are inserted between the end side portions 86a of the soft rubber members 86 of the rubber structural bodies 85A and the end side portions 86a of the soft rubber members 86 of the rubber structural bodies 85B with no gaps therebetween.

In other words, the starter-generator-side pressing protrusions 82p without bevels 82pt are pinched between the end side portions 86a of the soft rubber members 86.

When the starter-generator-side rotor 82 is combined with the internal-combustion-engine-side rotor 81, the internal-combustion-engine-side pressing protrusions 81p and the starter-generator-side pressing protrusions 82p are thus disposed in relative positions on superposed rotation trajectories.

FIG. 25 illustrates a state in which no relative torque load is applied to the internal-combustion-engine-side rotor 81 and the starter-generator-side rotor 82. The starter-generator-side pressing protrusions 82p with the bevels 82pt are positioned between the hard rubber members 87 with gaps on both sides thereof, whereas the starter-generator-side pressing protrusions 82p without bevels are positioned between the end side portions 86a of the soft rubber members 86 with no gap therebetween.

Figure 26:
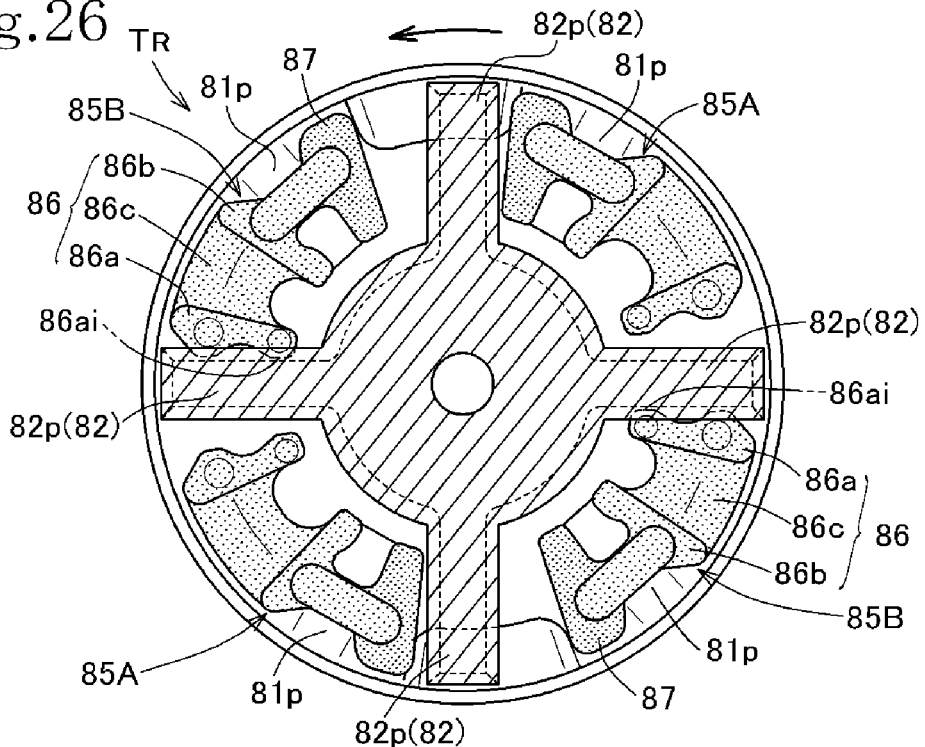
FIG. 26 is a cross-sectional view of the rear-stage power transmitting device under a low torque load applied when the internal combustion engine is in normal operation.

Under a low torque load applied to the internal-combustion-engine-side rotor 81 and the starter-generator-side rotor 82 through the intermediate shaft 60, causing them to rotate at a small rotational speed difference when the internal combustion engine 20 is in normal operation, as illustrated in FIG. 26, the internal-combustion-engine-side pressing protrusions 81p and the starter-generator-side pressing protrusions 82p without bevels press and compressively deform the soft rubber members 86 of the rubber structural bodies 85A therebetween, bringing the hard rubber members 87 of the rubber structural bodies 85B closer to the starter-generator-side pressing protrusions 82p with the bevels. Therefore, the soft rubber members 86 that are elastically deformable to a large extent and have a small modulus of elasticity absorb a smaller shock for smooth power transmission.

Under a high torque load applied to the internal-combustion-engine-side rotor 81 and the starter-generator-side rotor 82, causing them to rotate at a large rotational speed difference when the internal combustion engine 20 is operated for quick acceleration, the soft rubber members 86 of the rubber structural bodies 85A are further compressively deformed from the state illustrated in FIG. 26, and the hard rubber members 87 of the rubber structural bodies 85B contact the starter-generator-side pressing protrusions 82p with the bevels 82pt. The hard rubber members 87 of the rubber structural bodies 85B are pinched between the internal-combustion-engine-side pressing protrusions 81p and the starter-generator-side pressing protrusions 82p with the bevels. The hard rubber members 87 that are elastically deformable to a small extent and have a large modulus of elasticity are thus compressively deformed to absorb a larger shock.

Figure 27:
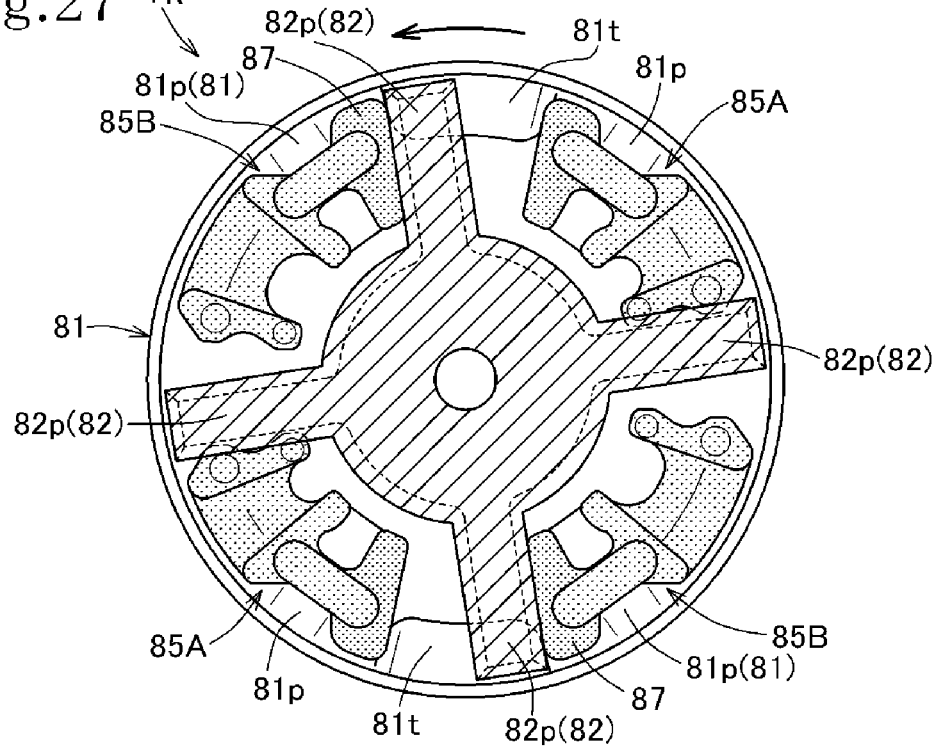
FIG. 27 is a cross-sectional view of the rear-stage power transmitting device under a high torque load applied when the internal combustion engine is started, etc.

When the internal combustion engine 20 is started or stalled, a large torque load is applied to the internal-combustion-engine-side rotor 81 and the starter-generator-side rotor 82, causing them to rotate at a large rotational speed difference. As illustrated in FIG. 27, the starter-generator-side pressing protrusions 82p without bevels and the internal-combustion-engine-side pressing protrusions 81p press and compressively deform the soft rubber members 86 of the rubber structural bodies 85B therebetween. The starter-generator-side pressing protrusions 82p with the bevels 82pt approach and contact the hard rubber members 87 of the rubber structural bodies 85A. The hard rubber members 87 of the rubber structural bodies 85A are pinched between the internal-combustion-engine-side pressing protrusions 81p and the starter-generator-side pressing protrusions 82p. The rubber members 76 that are elastically deformable to a small extent and have a large modulus of elasticity are thus compressively deformed to absorb a larger shock.

As described above, the power transmitting device according to the present embodiment includes the two-stage power transmitting devices $T_F$, and $T_R$ each having a shock absorbing function i.e., the front-stage power transmitting device $T_F$ and the rear-stage power transmitting device $T_R$, disposed in series with each other with the intermediate shaft 60 interposed therebetween, between the crankshaft 30 of the internal combustion engine 20 and the input/output shaft 51 of the starter generator 50. Therefore, the power transmitting device can reliably absorb shocks caused by torque loads produced between the internal combustion engine 20 and the starter generator 50, for smooth power transmission.

The front-stage power transmitting device $T_F$ according to the embodiment of the present invention described in detail above offers the following effects:

The single arc spring 75 is interposed between the internal-combustion-engine-side rotor (the first rotor) 71 and the starter-generator-side rotor (the second rotor) 72 that are disposed coaxially with the rotational central axis Lc and in facing relation to each other, for urging the internal-combustion-engine-side rotor 71 and the starter-generator-side rotor 72 in directions of rotation that are opposite each other, and the internal-combustion-engine-side pressing protrusions (the first pressing protrusions) 71p that project from the internal-combustion-engine-side rotor 71 and the starter-generator-side pressing protrusions (the second pressing protrusions) 72p that project from the starter-generator-side rotor 72 are disposed in relative positions on superposed rotation trajectories. As illustrated in FIG. 14, since the rubber members 76 are interposed between the internal-combustion-engine-side pressing protrusions 71p and the starter-generator-side pressing protrusions 72p with gaps, when a torque load is applied to the internal-combustion-engine-side rotor 71 and the starter-generator-side rotor 72, causing them to rotate relatively to each other, the arc spring 75 that is elastically deformable to a large extent and has a small modulus of elasticity is elastically deformed under compression (see FIG. 15). When the torque load increases, the first pressing protrusions and the second pressing protrusions further reduces the gaps therebetween, pinching the rubber members 76 which have been interposed therebetween with gaps, whereupon the soft rubber members 76 that are elastically deformable to a small extent and have a large modulus of elasticity are elastically deformed under compression (see FIG. 16).

While the torque load is low, as illustrated in FIG. 15, the arc spring 75 that is elastically deformable to a large extent and has a small modulus of elasticity effectively absorbs shocks in a large stroke.

When the torque load increases, the soft rubber members 76 that are elastically deformable to a small extent and have a large modulus of elasticity are elastically deformed under compression. As illustrated in FIG. 16, the soft rubber members 76 effectively absorb a larger shock for smooth power transmission.

In other words, the arc spring 75 operates under a low torque load and the rubber members 75 operate under a high torque load to effectively absorb shocks depending on the high or low torque load for smooth power transmission at all times.

As illustrated in FIG. 14, the arc spring 75 includes an arcuate coil spring. Even though the arc spring 75 interposed between the internal-combustion-engine-side rotor 71 and the starter-generator-side rotor 72 is single, it can be set to a large elastically operable angle (stroke) in which it is elastically deformable to make its elasticity work properly. Therefore, it is possible to provide a simple-structure, small-size shock absorbing mechanism made up of a small number of parts.

As illustrated in FIG. 13, since the arc spring 75 is interposed between the internal-combustion-engine-side rotor 71 and the starter-generator-side rotor 72 with the respective halves housed in the first housing groove 71$u$ and the second housing groove 72$u$, respectively, a compressing structure of the arc spring 75 for urging the internal-combustion-engine-side rotor 71 and the starter-generator-side rotor 72 in opposite directions of rotation and a holding structure of the arc spring can be made up of a minimum number of simple parts.

As illustrated in FIG. 13, as the rubber members 76 are fitted over the internal-combustion-engine-side pressing protrusions 71$p$, the rubber members 76 are simply mounted on the internal-combustion-engine-side pressing protrusions 71$p$ without using special mounting members, and fixedly supported between the internal-combustion-engine-side pressing protrusions 71$p$ and the starter-generator-side 72$p$.

On the internal-combustion-engine-side rotor 71, the first housing groove 71$u$ is open in the first facing surface 71$f$, and the arcuate grooves 71$v$ defined therein substantially concentrically with the first housing groove 71$u$ are open in the first facing surface 71$f$. The paired internal-combustion-engine-side pressing protrusions 71$p$ are disposed in each of the arcuate grooves 71$v$ near the both circumferential ends thereof, and the rubber members 76 are mounted respectively on the paired engine-side pressing protrusions 71$p$. On the starter-generator-side rotor 72, the second housing groove 72$u$ is open in the second facing surface 72$f$, and the starter-generator-side pressing protrusions 72$p$ project from the nearly circumferentially central portions of the arcuate areas of the second facing surface 72$f$ that correspond to the arcuate grooves 71$v$ in the second facing surface 72$f$. Therefore, the starter-generator-side pressing protrusions 72$p$ of the starter-generator-side rotor 72 are inserted between the rubber members 76 fitted respectively over the paired internal-combustion-engine-side pressing protrusions 71$p$ of the internal-combustion-engine-side rotor 71 (see FIG. 14). Under a high torque load, as illustrated in FIG. 16, each of the starter-generator-side pressing protrusions 72$p$ and either one of the paired internal-combustion-engine-side pressing protrusions 71$p$ pinch one of the rubber members 76. The rubber members that are elastically deformable to a small extent and have a large modulus of elasticity are elastically deformed under compression and effectively absorb a larger shock for smooth power transmission.

Referring to FIG. 13, since the rubber members 76 that are fitted over the internal-combustion-engine-side pressing protrusions 71$p$ are housed in the arcuate grooves 71$v$, the rubber members 76 do not project outwardly from the first facing surface 71$f$. Upon relative rotation of the internal-combustion-engine-side rotor 71 and the starter-generator-side rotor 72, the circumferential end edges of the second housing groove 72$u$ in the starter-generator-side rotor 72 do not physically interfere with the rubber members 76, and hence do not damage the rubber members 76 and impair the durability thereof.

Figure 9:
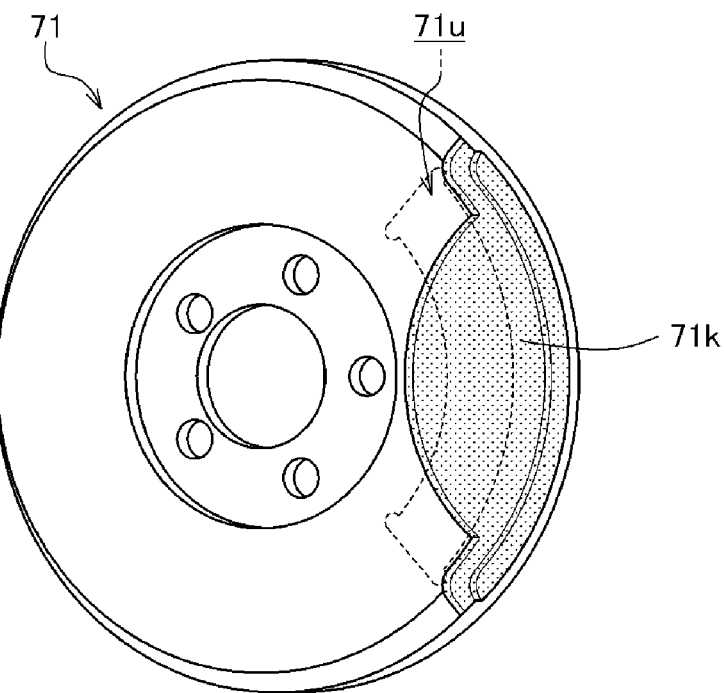
FIG. 9 is a perspective view of an internal-combustion-engine-side rotor of the front-stage power transmitting device.

Since the internal-combustion-engine-side rotor 71 of the disk shape has the pair of arcuate grooves 71$v$ opposite the first housing groove 71$u$ across the rotational central axis Lc, the internal-combustion-engine-side rotor 71 tends to be unbalanced as it is heavier on the side of the first housing groove 71$u$. As illustrated in FIG. 9, the machining margin 71$k$ for unbalance adjustment behind the first housing groove 71$u$ is cut off to reduce the unbalance, making the internal-combustion-engine-side rotor 71 balanced to thereby restrain itself from being vibrated due to the unbalance.

Since the second rotor 72 of the disk shape tends to be unbalanced as it is heavier on the side opposite the second housing groove 72$u$ across the rotational central axis Lc on account of the second housing groove 72$u$, as illustrated in FIGS. 8 and 13, the machining margin 72$k$ for unbalance adjustment is disposed opposite the second housing groove 72$u$ and cut off to reduce the unbalance, making the starter-generator-side rotor 72 balanced to thereby restrain itself from being vibrated due to the unbalance.

Under a low torque load applied to the internal-combustion-engine-side rotor 71 and the starter-generator-side rotor 72, causing them to rotate at a small rotational speed difference when the internal combustion engine 20 is in normal operation, as illustrated in FIG. 15, the arc spring 75 that is elastically deformable to a large extent and has a small modulus of elasticity is compressively deformed and absorbs a smaller shock for smooth power transmission.

On the other hand, under a high torque load applied to the internal-combustion-engine-side rotor 71 and the starter-generator-side rotor 72, causing them to rotate at a large rotational speed difference when the internal combustion engine is started, stalled, or operated for quick acceleration, as illustrated in FIG. 16, the rubber members 76 that are elastically deformable to a small extent and have a large modulus of elasticity, as well as the arc spring 75, are compressively deformed and absorb a larger shock.

As illustrated in FIG. 14, when there is no rotational speed difference between the internal-combustion-engine-side rotor and the starter-generator-side rotor, the angle θa from each of the starter-generator-side pressing protrusions 72$p$ to one of the rubber members 76 spaced therefrom in the direction of rotation, as indicated by the arrow in FIG. 14, is smaller than the angle θb from the starter-generator-side pressing protrusion 72$p$ to the other rubber member 76 spaced therefrom in the direction opposite the direction of rotation.

In other words, when no relative torque load is applied to the internal-combustion-engine-side rotor 71 and the starter-generator-side rotor 72, the starter-generator-side pressing protrusions 72$p$ are positioned closer to those rubber members 76 that are spaced therefrom in the direction of rotation. Consequently, for an engine startup, the starter-generator-side pressing protrusions 72 act earlier on those rubber members 76 that are spaced therefrom in the direction of rotation, resulting in a reduced operation loss for starting the engine early (see FIG. 16).

When the motorcycle travels normally, until the starter-generator-side pressing protrusions 72$p$ act on the other rubber members 76 that are positioned on the opposite side of the starter-generator-side pressing protrusions 72$p$ to the direction of rotation, the arc spring 75 is compressively varied to a large extent and absorbs a smaller shock for smooth power transmission. Noise such as gear lash noise can thus be restrained (see FIG. 15).

Referring to FIGS. 5 and 6, the internal-combustion-engine-side rotor 71 is fixed to the small-diameter helical gear 33 in mesh with the large-diameter helical gear 32 is slidably supported on the rotor shaft 72s of the disk-shaped starter-generator-side rotor 72. The disk spring 35 is interposed between the collar 35 that is prevented from sliding by the stopper 36 that engages the outer circumference of the rotor shaft 72s on the opposite side of the internal-combustion-engine-side rotor 71 with respect to the small-size helical gear 33. Therefore, the internal-combustion-engine-side rotor 71 is normally urged by the disk spring 35 to move toward the disk-shaped starter-generator-side rotor 72, and is allowed to move together with the small-diameter helical gear 33 in a thrust direction against the disk spring 35 for smooth power transmission while being prevented from being unnecessarily spaced away from the disk-shaped starter-generator-side rotor 72.

Referring to the meshing engagement between the small-diameter helical gear 33 and the large-diameter helical gear 32 and the directions of rotation indicated by the arrows in FIG. 6, the small-diameter helical gear 33 has a left-hand thread helix (with threads helically oriented to the left as viewed in front elevation). Therefore, for an engine startup, the helical gears operate as drive gears, pressing the internal-combustion-engine-side rotor 71 against the starter-generator-side rotor 72. The helical gears are prevented from moving in a thrust direction for transmitting power without an operation loss, so that the internal combustion engine can quickly be started without a feeling of startup slowness. For an engine acceleration, on the other hand, the helical gears operate as driven gears, moving the internal-combustion-engine-side rotor 71 in a thrust direction away from the starter-generator-side rotor 72 against the disk spring to absorb shocks.

While the rear-stage power transmitting device $T_R$ according to the embodiment of the present invention has been described hereinbefore, the present invention is not limited to the above embodiment, but may be implemented in various forms within the scope of the invention.

For example, the vehicle according to the present invention is not limited to the saddle-type motorcycle 1 according to the embodiment, but may be any of various saddle-type vehicles including scooter-type vehicles, three-wheeled and four-wheeled buggies, etc. insofar as they incorporate the requirements of claim 1.

REFERENCE SIGNS LIST

1 . . . Motorcycle, 2 . . . Vehicle body frame, 3 . . . Head pipe, 4 . . . Main frame, 5 . . . Pivot frame, 6 . . . Seat frame, 7 . . . , 8 . . . Steering stem, 9 . . . Steering handle, 10 . . . Front fork member, 11 . . . Front wheel, 12 . . . Swing arm, 13 . . . Pivot shaft, 14 . . . Rear wheel, 20 . . . Internal combustion engine, 21 . . . Crankcase, 21L . . . Left cylinder portion, 21R . . . Right cylinder portion, 21P . . . Oil pan, 21Wr . . . Rear barrier rib, 21Wp . . . Pump barrier rib, 22L . . . Left cylinder head, 22R . . . Right cylinder head, 23L . . . Left cylinder head cover, 23R . . . Right cylinder head cover, 24 . . . Front crankcase cover, 25 . . . Rear crankcase cover, 26 . . . Clutch cover, 27 . . . Piston, 28 . . . Connecting rod, 30 . . . Crankshaft, 31 . . . Primary drive gear, 32 . . . Large-diameter helical gear, 33 . . . Small-diameter helical gear, 34 . . . Mounting bolt, 35 . . . Disk spring, 36 . . . Collar, 37 . . . Stopper, 38 . . . Retainer, 39 . . . Circlip, 40 . . . Transmission, 41 . . . Main shaft, 42 . . . Countershaft, 43 . . . Output shaft, 44 . . . , 45 . . . Twin clutch, 46 . . . Primary driven gear, 50 . . . Starter generator, 51 . . . Input/Output shaft, 52 . . . Bearing, 60 . . . Intermediate shaft, 61, 62 . . . Bearing, 63 . . . Pressing plate, 64 . . . Bolt, 65 . . . Seal ring, 66 . . . Mounting bolt, 67 . . . Washer, 68 . . . Mounting bolt, 69 . . . Washer, $T_F$ . . . Front-stage power transmitting device, 71 . . . Internal-combustion-engine-side rotor (First rotor), 71f . . . Facing surface, 71u . . . First housing groove, 71v . . . Arcuate groove, 71p . . . Internal-combustion-engine-side pressing protrusion (First pressing protrusion), 71k . . . Machining margin, 72 . . . Starter-generator-side rotor (Second rotor), 72a . . . Disk, 72s . . . Tubular shaft, 72f . . . Facing surface, 72u . . . Second housing groove, 72p . . . Starter-generator-side pressing protrusion (Second pressing protrusion), 72k . . . Machining margin, 75 . . . Arc spring, 76 . . . Rubber member, $T_R$ . . . Rear-stage power transmitting device, 81 . . . Internal-combustion-engine-side rotor, 81p . . . Internal-combustion-engine-side pressing protrusion, 81t . . . Land, 81pp . . . Projection, 82 . . . Starter-generator-side rotor, 82p . . . Starter-generator-side pressing protrusion, 82pt . . . Bevel, 85A, 85B . . . Rubber structural body, 86 . . . Soft rubber member, 86a, 86b . . . End side portion, 86c . . . Interconnecting web, 86ai, 86bi . . . Inner end protrusion, 86ao, 86bo . . . Outer end protrusion, 87 . . . Hard rubber member, 87c . . . Connecting rubber web

The invention claimed is:

1. A power transmitting device comprising:
   a first rotor and a second rotor that are rotatably disposed coaxially with a rotational central axis- and in facing relation to each other;
   a single arc spring that is elastically deformable to an extent and has a modulus of elasticity, the arc spring being interposed between the first rotor and the second rotor for urging the first rotor and the second rotor to opposite sides in a rotation direction;
   a first pressing protrusion projecting from the first rotor and a second pressing protrusion projecting from the second rotor, the first pressing protrusion and the second pressing protrusion being disposed in relative positions on superposed rotation trajectories; and
   a rubber member that is elastically deformable to a smaller extent than the arc spring and has a larger modulus of elasticity than the arc spring, the rubber member being interposed between the first pressing protrusion and the second pressing protrusion with gaps therebetween;
   wherein:
   the first rotor and the second rotor have a first housing groove and a second housing groove of an identical arcuate shape, defined respectively in a first facing surface and a second facing surface thereof that are disposed closely to each other and in facing relation to each other;
   the arc spring has halves, housed respectively in the first housing groove and the second housing groove, and is interposed between the first rotor and the second rotor, and
   the rubber member is fitted over either the first pressing protrusion or the second pressing protrusion.

2. The power transmitting device as claimed in claim 1, wherein the first rotor has:
- an arcuate groove defined in the first facing surface on substantially the same circumference as the first housing groove;
- a pair of the first pressing protrusions disposed in the arcuate groove respectively near circumferentially opposite ends of the arcuate groove; and
- the rubber member fitted over each of the first pressing protrusions; and the second rotor has:
- the second housing groove being open in the second facing surface; and
- the second pressing protrusion projecting from a nearly circumferentially central portion of an arcuate area of the second facing surface that corresponds to the arcuate groove.

3. The power transmitting device as claimed in claim 2, wherein the rubber member fitted over each of the first pressing protrusions is housed in the arcuate groove.

4. The power transmitting device as claimed in claim 3, wherein the first rotor is of a disk shape and has a pair of the arcuate grooves defined therein opposite portions of the first housing groove across the rotational central axis;
- the first rotor has a machining margin for unbalance adjustment behind the first housing groove that houses one-half of the arc spring therein; and
- the second rotor is of a disk shape and has a machining margin for unbalance adjustment opposite the second housing groove across the rotational central axis.

5. The power transmitting device as claimed in claim 4, wherein
- the first rotor includes an internal-combustion-engine-side rotor with power being transmittable between itself and a crankshaft of an internal combustion engine;
- the second rotor includes a starter-generator-side rotor with power being transmittable between itself and an input/output shaft of a starter generator;
- the first pressing protrusion includes an internal-combustion-engine-side pressing protrusion; and
- the second pressing protrusion includes a starter-generator-side pressing protrusion.

6. The power transmitting device as claimed in claim 3, wherein
- the first rotor includes an internal-combustion-engine-side rotor with power being transmittable between itself and a crankshaft of an internal combustion engine;
- the second rotor includes a starter-generator-side rotor with power being transmittable between itself and an input/output shaft of a starter generator;
- the first pressing protrusion includes an internal-combustion-engine-side pressing protrusion; and
- the second pressing protrusion includes a starter-generator-side pressing protrusion.

7. The power transmitting device as claimed in claim 6, wherein the starter-generator-side pressing protrusion that is disposed between a pair of the rubber members fitted respectively over a pair of the internal-combustion-engine-side pressing protrusions is positioned closer to one of the rubber members that is spaced from the starter-generator-side pressing protrusion in the direction of rotation when no relative torque load is applied to the internal-combustion-engine-side rotor and the starter-generator-side rotor.

8. The power transmitting device as claimed in claim 7, wherein
- the starter-generator-side rotor has a tubular shaft projecting from a central portion thereof through the internal-combustion-engine-side rotor and having the rotational central axis as a central axis;
- a helical gear is slidably supported on the tubular shaft on a side thereof opposite the starter-generator-side rotor across the internal-combustion-engine-side rotor;
- the internal-combustion-engine-side rotor that faces the starter-generator-side rotor is fixed to the helical gear; and
- a disk spring is interposed between a collar that is prevented from sliding by a stopper that engages an outer circumference of the tubular shaft on an opposite side of the internal-combustion-engine-side rotor with respect to the helical gear and the helical gear.

9. The power transmitting device as claimed in claim 6, wherein
- the starter-generator-side rotor has a tubular shaft projecting from a central portion thereof through the internal-combustion-engine-side rotor and having the rotational central axis as a central axis;
- a helical gear is slidably supported on the tubular shaft on a side thereof opposite the starter-generator-side rotor across the internal-combustion-engine-side rotor;
- the internal-combustion-engine-side rotor that faces the starter-generator-side rotor is fixed to the helical gear; and
- a disk spring is interposed between a collar that is prevented from sliding by a stopper that engages an outer circumference of the tubular shaft on an opposite side of the internal-combustion-engine-side rotor with respect to the helical gear and the helical gear.

10. The power transmitting device as claimed in claim 9, wherein the helical gear has such a thread helix that when the helical gear operates as a drive gear, the helical gear produces a thrust force for pressing the internal-combustion-engine-side rotor against the starter-generator-side rotor.

11. A power transmitting device comprising:
- a first rotor and a second rotor that are rotatably disposed coaxially with a rotational central axis and in facing relation to each other;
- a single arc spring that is elastically deformable to an extent and has a modulus of elasticity, the arc spring being interposed between the first rotor and the second rotor for urging the first rotor and the second rotor to opposite sides in a rotation direction;
- a first pressing protrusion projecting from the first rotor and a second pressing protrusion projecting from the second rotor, the first pressing protrusion and the second pressing protrusion being disposed in relative positions on superposed rotation trajectories; and
- a rubber member that is elastically deformable to a smaller extent than the arc spring and has a larger modulus of elasticity than the arc spring, the rubber member being interposed between the first pressing protrusion and the second pressing protrusion with gaps therebetween;

wherein the rubber member is fitted over either the first pressing protrusion or the second pressing protrusion.

* * * * *